US011323692B2

(12) United States Patent
Hagio et al.

(10) Patent No.: US 11,323,692 B2
(45) Date of Patent: May 3, 2022

(54) ASSET MANAGEMENT SYSTEM AND ASSET MANAGEMENT METHOD

(71) Applicant: PANASONIC i-PRO SENSING SOLUTIONS CO., LTD., Fukuoka (JP)

(72) Inventors: Minoru Hagio, Fukouoka (JP); Junichi Hamada, Fukouoka (JP); Masahiro Nomoto, Fukuoka (JP); Shinichi Arai, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/910,895

(22) Filed: Jun. 24, 2020

(65) Prior Publication Data
US 2020/0413034 A1 Dec. 31, 2020

(30) Foreign Application Priority Data

Jun. 28, 2019 (JP) .............................. JP2019-122355

(51) Int. Cl.
| | | |
|---|---|---|
| *H04N 17/00* | (2006.01) | |
| *H04N 7/18* | (2006.01) | |
| *H04N 5/232* | (2006.01) | |
| *H04N 5/225* | (2006.01) | |
| *H04N 21/239* | (2011.01) | |
| *H04N 21/235* | (2011.01) | |
| *H04N 21/258* | (2011.01) | |

(52) U.S. Cl.
CPC ......... *H04N 17/002* (2013.01); *H04N 5/2253* (2013.01); *H04N 5/232* (2013.01); *H04N 5/23203* (2013.01); *H04N 7/18* (2013.01); *H04N 21/235* (2013.01); *H04N 21/239* (2013.01); *H04N 21/25808* (2013.01)

(58) Field of Classification Search
CPC .... H04N 17/002; H04N 5/2253; H04N 5/232; H04N 7/18; H04N 21/235; H04N 21/239; H04N 21/25808; H04N 21/442; H04N 21/44231; H04N 21/4425; H04N 21/435; H04N 21/4508
See application file for complete search history.

(56) References Cited

U.S. PATENT DOCUMENTS 9,854,211 B2 * 12/2017 Yamaguchi ............. H04N 5/77
10,360,744 B1 * 7/2019 Kerzner ............... G08B 13/196
(Continued)

FOREIGN PATENT DOCUMENTS

JP 2004-240498 A 8/2004

*Primary Examiner* — Alexander Q Huerta
(74) *Attorney, Agent, or Firm* — Seed IP Law Group LLP

(57) ABSTRACT

In an asset management system, a wearable camera mountable by a police officer and a server that manages information regarding the wearable camera are connected to enable a communication. The wearable camera repeatedly diagnoses whether or not the wearable camera has failure at a predetermined timing, and notifies the server of a diagnosis result. The server is connected to a database, accumulates the diagnosis result of the wearable camera in the database every time the server receives the diagnosis result of the wearable camera, and displays the diagnosis result of the wearable camera on an external terminal.

19 Claims, 10 Drawing Sheets

(56) References Cited

U.S. PATENT DOCUMENTS

| | | | |
|---|---|---|---|
| 2013/0305156 A1* | 11/2013 | Hohteri | G06F 3/04842 715/719 |
| 2014/0157344 A1* | 6/2014 | Tine | H04N 21/239 725/115 |
| 2016/0042767 A1* | 2/2016 | Araya | H04N 7/188 386/201 |
| 2016/0182850 A1* | 6/2016 | Thompson | H04N 1/00106 348/158 |
| 2017/0018047 A1* | 1/2017 | Hanchett | G06Q 50/265 |
| 2017/0133051 A1* | 5/2017 | Mack | A42B 1/242 |
| 2017/0178678 A1* | 6/2017 | Ross | H04N 5/76 |
| 2017/0217319 A1* | 8/2017 | Araki | G01B 21/16 |
| 2017/0316531 A1* | 11/2017 | Smith | G06F 16/2365 |
| 2018/0048851 A1* | 2/2018 | Waniguchi | H04N 21/6543 |
| 2018/0101723 A1* | 4/2018 | Wakako | G06K 9/20 |

* cited by examiner

ASSET MANAGEMENT SYSTEM AND ASSET MANAGEMENT METHOD

BACKGROUND OF THE INVENTION

1. Field of the Invention

The present disclosure relates to an asset management system and an asset management method for managing information regarding a wearable camera.

2. Background Art

JP-A-2004-240498 discloses a remote support system for an electronic device, that automates the support of an electronic device such as a digital camera to decrease cost of a manufacturer and improve the convenience for a user. The remote support system includes a diagnostic server, a PC, and a device. The diagnostic server includes a knowledge database, a Web server, and a diagnostic framework that performs a diagnostic procedure. The PC includes a Web browser, a device connection unit, and a relay manager that transmits a diagnostic application execution result log received from the electronic device to the diagnostic server. The device includes a PC connection unit and a diagnostic manager that transmits a diagnostic application execution result.

SUMMARY OF THE INVENTION

In the remote support system in JP-A-2004-240498, a general household electronic device such as a digital camera, which is owned by a general user is set as a target, and a case where a wearable camera which is mounted on an investigator of an investigative agency (for example, a police officer of a police department) on patrol or at an incident site and is used during business hours is set as the target is not assumed. The wearable camera mounted on the police officer may be used by a specific police officer as a personal person, or may be randomly used by an unspecified number of police officers. Therefore, the wearable camera is used differently depending on the individual, and there are cases where the wearable camera is easy to have failure and hard to have failure. However, different from the general household electronic devices, the wearable camera is required not to have failure before the use of the camera in view of the peculiarities of the police business. Thus, it is considered that asset management for whether or not the wearable camera has failure is required to be appropriately performed.

The present disclosure has been made in view of the above-described conventional circumstances. An object thereof is to provide an asset management system and an asset management method for properly managing a wearable camera by regularly determining whether or not the wearable camera used in the daily work of a police or investigative agency has failure and suppressing deterioration of business efficiency of police officers or investigators.

According to the present disclosure, there is provided an asset management system in which a wearable camera that is mountable by a police officer and a server that is configured to manage information regarding the wearable camera and is communicably connected to the wearable camera. The wearable camera repetitively diagnoses whether or not the wearable camera has failure at a predetermined timing and notifies the server of a diagnosis result. The server is connected to a database, accumulates the diagnosis result in the database every time the diagnosis result of the wearable camera is received, and displays the diagnosis result of the wearable camera on an external terminal.

According to the present disclosure, there is provided an asset management method performed by an asset management system in which a wearable camera that is mountable by a police officer and a server that is configured to manage information regarding the wearable camera and is communicably connected to the wearable camera. The asset management method includes repeatedly diagnosing whether or not the wearable camera has failure at a predetermined timing and sending, to the server, a diagnosis result, performing a connection to a database, and accumulating a diagnosis result of the wearable camera in the database every time the diagnosis result of the wearable camera is received, and displaying the diagnosis result of the wearable camera on an external terminal.

According to the present disclosure, it is possible to properly manage a wearable camera by regularly determining whether or not the wearable camera used in the daily work of a police or investigative agency has failure and to suppress deterioration of business efficiency of police officers or investigators.

DETAILED DESCRIPTION OF THE EXEMPLARY EMBODIMENT

Hereinafter, an embodiment obtained by specifically disclosing an asset management system and an asset management method according to the present disclosure will be described in detail with reference to the drawings as appropriate. A detailed description more than necessary may be omitted. For example, a detailed description of a well-known item or a redundant description of substantially the same configuration may be omitted. This is to prevent the unnecessary redundancy of the following description and to facilitate understanding by those skilled in the art. The accompanying drawings and the following description are provided to enable those skilled in the art to fully understand the present disclosure, and are not intended to limit the claimed subject matter.

In the following embodiment, a wearable camera will be described as being used in a state of being mounted on a police officer of a police department during business hours. However, the description may be applied to an example in which the wearable camera is used in a state of being mounted on an investigator of an investigative agency, which is different from the police officer of the police department.

Figure 1:
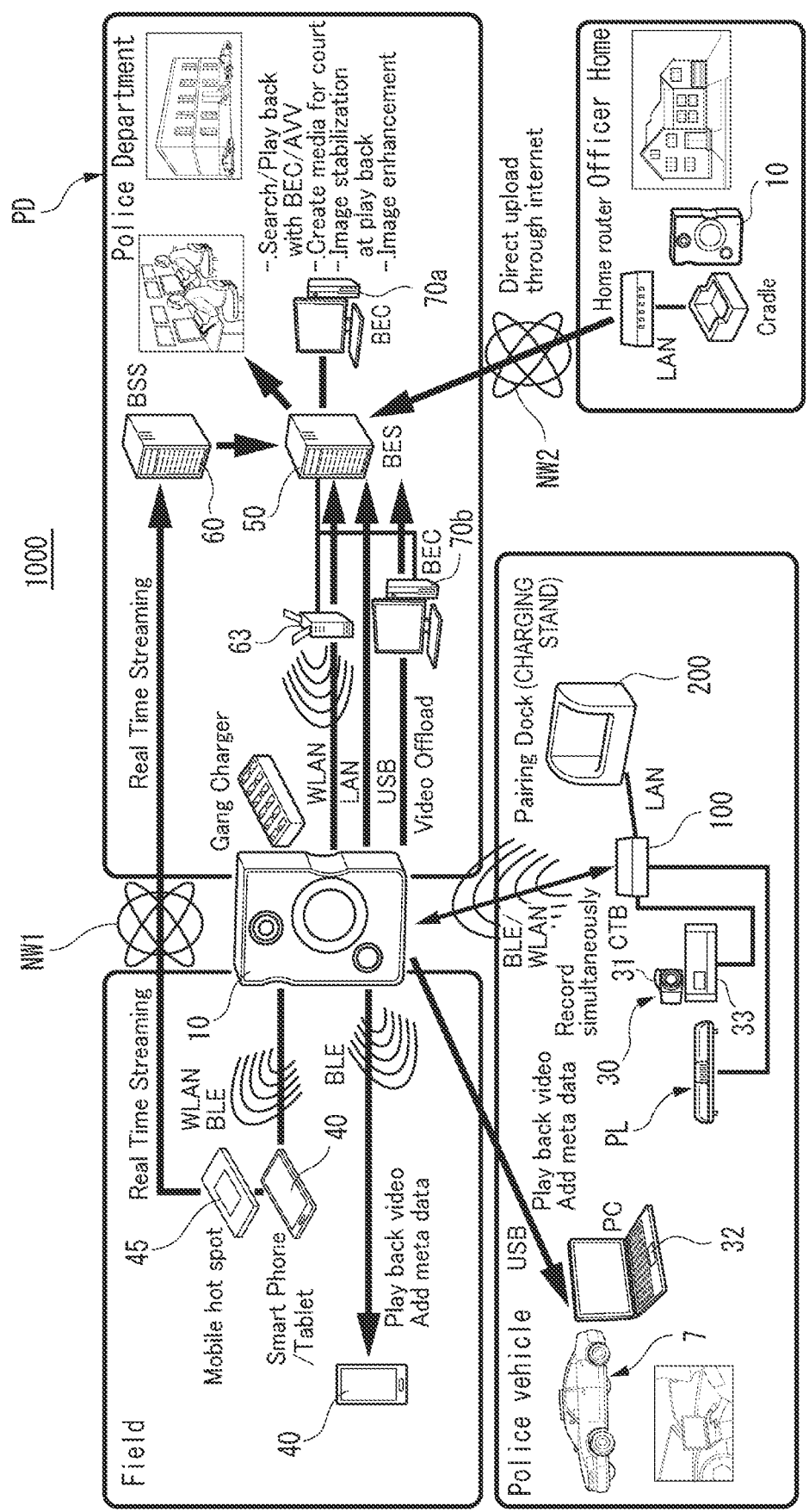
FIG. 1 is a schematic diagram illustrating an example of a system configuration of a communication system according to Embodiment 1.

FIG. 1 is a schematic diagram illustrating an example of a system configuration of a communication system 1000 according to Embodiment 1. The communication system 1000 illustrated in FIG. 1 includes a wearable camera 10 that can be mounted or held by a police officer, various devices arranged in a police department PD, and various devices used by a police officer in a field, various devices used or mounted in a police vehicle (for example, patrol car. This is similarly applied below) 7, and various devices used in an officer home. The wearable camera 10 may be included in any one of the various devices arranged in the police department PD, the various devices used by a police officer in the field, the various devices used or mounted in the police vehicle, and the various devices used in the officer home.

The various devices arranged in the police department PD include, for example, at least a back end server (BES) 50, a back end streaming server (BSS) 60, back end clients (BEC) 70a and 70b, a wireless local area network (LAN) access point 63, and a gang charger. The gang charger is an example of a charging device capable of collectively charging a plurality of wearable cameras. However, the various devices are not limited thereto.

The various devices used by a police officer in the field include, for example, at least a smartphone 40 (a tablet terminal is also possible) and a wireless LAN access point 45 that may be held by the police officer. However, the various devices are not limited thereto. The smartphone 40 or the wireless LAN access point 45 are held, for example, in a pocket of a uniform worn by a police officer.

The various devices used or mounted in the police vehicle 7 include, for example, at least an in-car video system (ICV) 30, an in-car PC 32, a common trigger box (CTB) 100 as an example of an in-car communication device, a charging stand 200 as an example of a charging device, and a rotation warning lamp PL. However, the various devices are not limited thereto. The police vehicle 7 has a wireless LAN access point (not illustrated). The wireless LAN access point wirelessly connects the in-car video system 30 and the wearable camera 10 connected to the in-car video system 30 to the back end server 50 in the police department PD.

The various devices used in the officer home include, for example, at least a cradle for charging the wearable camera 10 and a home router, but are not limited thereto.

The in-car video system 30 includes one or a plurality of in-car cameras 31, an in-car PC 32, and an in-car recorder 33, and captures and records a video image of a situation encountered during traveling in the police vehicle 7 or a situation such as patrol. The one or plurality of in-car cameras 31 includes one or a plurality of, for example, cameras installed to capture an image of the front of the police vehicle 7 and cameras installed to capture images of the left side, the right side, and the rear side of the police vehicle 7, respectively. The in-car PC 32 controls operations of the in-car camera 31 and the in-car recorder 33 in accordance with an operation of the police officer. The in-car recorder 33 records data of a video image captured by each of the plurality of in-car cameras 31 in time series. In a case where the in-car PC 32 is connected to the wearable camera 10 by a universal serial bus (USB), the in-car PC is not only capable of charging the wearable camera 10, but also acquires data of a video image captured by the wearable camera 10 through the USB to reproduce the data in a default application installed on the in-car PC 32 or to add attribute information of the image in the application in accordance with an operation of the police officer.

The in-car video system 30 is connected to the common trigger box 100 by wire (for example, LAN communication), and operates (for example, starts or stop data recording (that is, video recording) of a video image captured by the in-car camera 31) in accordance with a command from the common trigger box 100. The common trigger box 100 wirelessly connects the in-car video system 30 to the wearable camera 10 in a wireless LAN communication or a Bluetooth (registered trademark) low energy (BLE) communication.

The in-car video system 30 is connected to the wearable camera 10 through the common trigger box 100 to enable a communication, and starts recording with the in-car recorder 33 at the same timing as a timing at which the wearable camera 10 starts image capturing. On the contrary, the wearable camera 10 may start recording at the same time as a timing at which the in-car recorder 33 starts image capturing. The in-car video system 30 may record a video image captured by the wearable camera 10, with the in-car recorder 33. The in-car video system 30 may be directly connected to the back end server 50 in the police department by the Long Term Evolution (LTE) communication performed through the wireless LAN access point in the police vehicle 7.

The wearable camera 10 is attached to or held by the uniform of a police officer as an example of a user, and continuously captures an image of a situation in front of the police officer as a subject while the police officer is out. The wearable camera 10 may transmit data of a video image obtained by image capturing to the in-car video system 30 through the common trigger box 100. The wearable camera 10 and the in-car recorder 33 may simultaneously start the image capturing. The wearable camera 10 may directly transmit the data to the back end server 50 through the wireless LAN access point 63 or stream the data to the back end streaming server 60 through the smartphone 40 or the wireless LAN access point 45, and a network NW1 (for example, a mobile communication network or an Internet network). In the police department PD, the wearable camera 10 may transmit data of a video image obtained by image capturing to the back end client 70b connected by the USB or to the back end server 50 connected by a LAN in the police department PD. The wearable camera 10 may transmit the data of the captured video image to the back end server 50 in a state of being manually placed on the charging surface of the gang charger.

The subject as an image capturing target of the wearable camera 10 and the in-car camera 31 includes not only people but also scenes of the incident, crowds near the scene (so-called onlookers), and the atmosphere around the image capturing position. A police officer may hold a smartphone 40 or a wireless LAN access point 45 as an example of a wireless terminal capable of communicating with the wearable camera 10.

The smartphone 40 has a telephone function and a wireless communication function (for example, a tethering function), and is used, for example, at the time of an emergency call from the police department or an emergency call to the police department. Further, the smartphone 40 relays data from the wearable camera 10 to the back end streaming server 60 in the police department PD. The smartphone 40 reproduces the data of the video image captured by the wearable camera 10 or performs editing, for example, adding attribute information (metadata) to the data of the captured video image, in accordance with the operation of the police officer.

The wireless LAN access point 45 relays the data from the wearable camera 10 to the back end streaming server 60 in the police department PD. A wireless communication (for example, BLE) or a WLAN (wireless LAN, for example, Wifi (registered trademark)) is used between the wearable camera 10, and the smartphone 40 or the wireless LAN access point 45. When the wearable camera 10 performs high-speed communication such as streaming to the back end streaming server 60 through the smartphone 40 or the wireless LAN access point 45, a wireless communication using a wireless LAN having a higher transmission speed than BLE is used. When, for example, editing by the smartphone 40 on data such as a case number of a video image captured by the wearable camera 10 may be realized by a low-speed communication, a wireless communication using BLE is used.

The back end server 50 includes a content management server 51 (see FIG. 2) that manages an evidence video image of a case as a content, and a device management server 55 (see FIG. 2) that manages the wearable camera 10 and the in-car video system 30. Details of the content management server 51 and the device management server 55 will be described later.

For example, the back end server 50 has a video analysis function such as a face recognition function of or an editing function in accordance with a request in response to an operation of a user (for example, a system administrator or an analysis specialist in the police department PD) who uses the back end client 70a or 70b. The face recognition function is used for recognizing the face in an image frame constituting a video image captured by the wearable camera 10 or the in-car camera 31. The editing function is used for editing at least a portion of the video image with image processing or the like. The back end client 70a is a PC used when a system administrator manages the states or position information of the wearable camera 10 and the in-car video system 30. The back end client 70b is an upload-specific PC used for uploading data of a video image captured by the wearable camera 10 to the back end server 50. The back end server 50 has a reproduction function of reproducing a video image captured by the wearable camera 10 or the in-car camera 31, in accordance with a request in response to an operation of the user (for example, a system administrator or an analysis specialist in the police department PD) who uses the back end client 70a or 70b.

The back end streaming server 60 receives video data streamed from the wearable camera 10 and transfers the data of a video image to the back end server 50.

The back end clients 70a and 70b are configured by, for example, PCs. The back end client 70a or 70b has a browser or a dedicated application allowed to access a suspicious person database (not illustrated) in the back end server 50, to search for information regarding a case of a criminal or the like, and to display a search result on a display device (for example, a liquid crystal display (LCD) provided in the back end client 70a or 70b). In this specification and the accompanying drawings, a database may be abbreviated as "a DB". In the suspicious person database, for example, a wanted person, a criminal in the past, or the like is registered in advance in association with information (for example, a case number) for identifying a case. The back end clients 70a and 70b may access a sound database in the back end server 50 and search for sound information regarding an incident of a criminal or the like. The back end client 70 may be installed not only in the police department but also outside the police department. The back end client 70 may be either a thin client PC or a rich client PC.

The wireless LAN access point 63 is wirelessly connected to the wearable camera 10 by a wireless LAN (WLAN), and relays and transfers, for example, data of a video image transmitted from the wearable camera 10 to the back end server 50.

The gang charger is capable of placing the wearable camera 10 mounted or held by a plurality of police officers on a predetermined charging surface, and charges the battery of each placed wearable camera 10. The gang charger has a function of performing a wired communication with the wearable camera 10 during charging and transmitting data of a video image stored in the wearable camera 10 to the back end server 50. Alternatively, the wearable camera 10 may directly communicate with the back end server 50 by a LAN interface (not illustrated) through the gang charger. The gang charger is connected to the back end client 70b through a USB cable by wire.

The common trigger box 100 is connected to the rotation warning lamp PL, a siren (not illustrated), the in-car video system 30, and the charging stand 200 by wire (for example, a LAN communication), and may be connected to the wearable camera 10 through the charging stand 200 when the wearable camera 10 is connected to the charging stand 200. The common trigger box 100 controls recording start or recording stop synchronized between the wearable camera 10 and a CTB connection device in a state where a control signal of recording start or recording stop is transmitted between a device (may also be referred to as "the CTB connection device" below) and the wearable camera 10, by using BLE or a WLAN (wireless LAN). The CTB connection device is connected to the common trigger box 100 in a wired or wireless manner. The CTB connection device corresponds to, for example, the rotation warning lamp PL, the siren (not illustrated), the in-car video system 30, and the charging stand 200 described above.

In a case where the common trigger box 100 is connected to the in-car video system 30 by wire (for example, a LAN communication), the common trigger box 100 transmits the control signal of recording start or recording stop to the in-car video system 30. Thus, the in-car video system 30 can, for example, start recording (video recording) of the data of the video image captured by the in-car camera 31 in the in-car recorder 33 or stop the recording (video recording), as an operation in accordance with the control signal from the common trigger box 100. For example, if the common trigger box 100 acquires an operation start signal from a device (such as the rotation warning lamp PL or the siren) mounted in a police vehicle, the common trigger box 100 detects the start of using the device mounted in the police vehicle and transmits the control signal of recording start or recording stop to the wearable camera 10 or the in-car video system 30 connected to the common trigger box 100. Thus, the wearable camera 10 or the in-car video system 30 can start or stop recording of the data of a video image obtained by image capturing, for example, in response to a start of rotation of the rotation warning lamp PL or a sound output of the siren, as an operation in accordance with the control signal from the common trigger box 100.

In a case where only the in-car recorder 33 and the wearable camera 10 are provided as a connection device of the common trigger box, if one (for example, the in-car recorder 33) transmits a message indicating that recording has been started or stopped to the common trigger box 100, the common trigger box 100 transmits the control signal of starting or stopping recording to the other (for example, the wearable camera 10). Thus, the common trigger box 100 may cause both the in-car recorder 33 and the wearable camera 10 to substantially simultaneously start or stop recording.

The charging stand 200 is disposed, for example, at a predetermined position (for example, near the center console) of the police vehicle 7, and is connected to the common trigger box 100 by wire (for example, Power over Ethernet (PoE (registered trademark)) using a LAN cable). The charging stand 200 has a charging surface on which the wearable camera 10 is placed. In a case where the charging stand 200 is connected to the common trigger box 100 by wire (for example, PoE using a LAN cable) and is connected to the wearable camera 10 in a state where the wearable camera 10 is placed on the charging surface, the charging stand 200 may charge the battery of the wearable camera 10 based on a current supplied from the common trigger box 100.

It is assumed that a police officer places the wearable camera 10 on a cradle corresponding to the wearable camera 10 when the police officer returns to home or is on vacation. In this case, the wearable camera 10 may transmit the data of a video image captured by the wearable camera 10 to the back end server 50 via a home router and a network NW2 connected to the cradle by wire (for example, a LAN communication).

Figure 2:
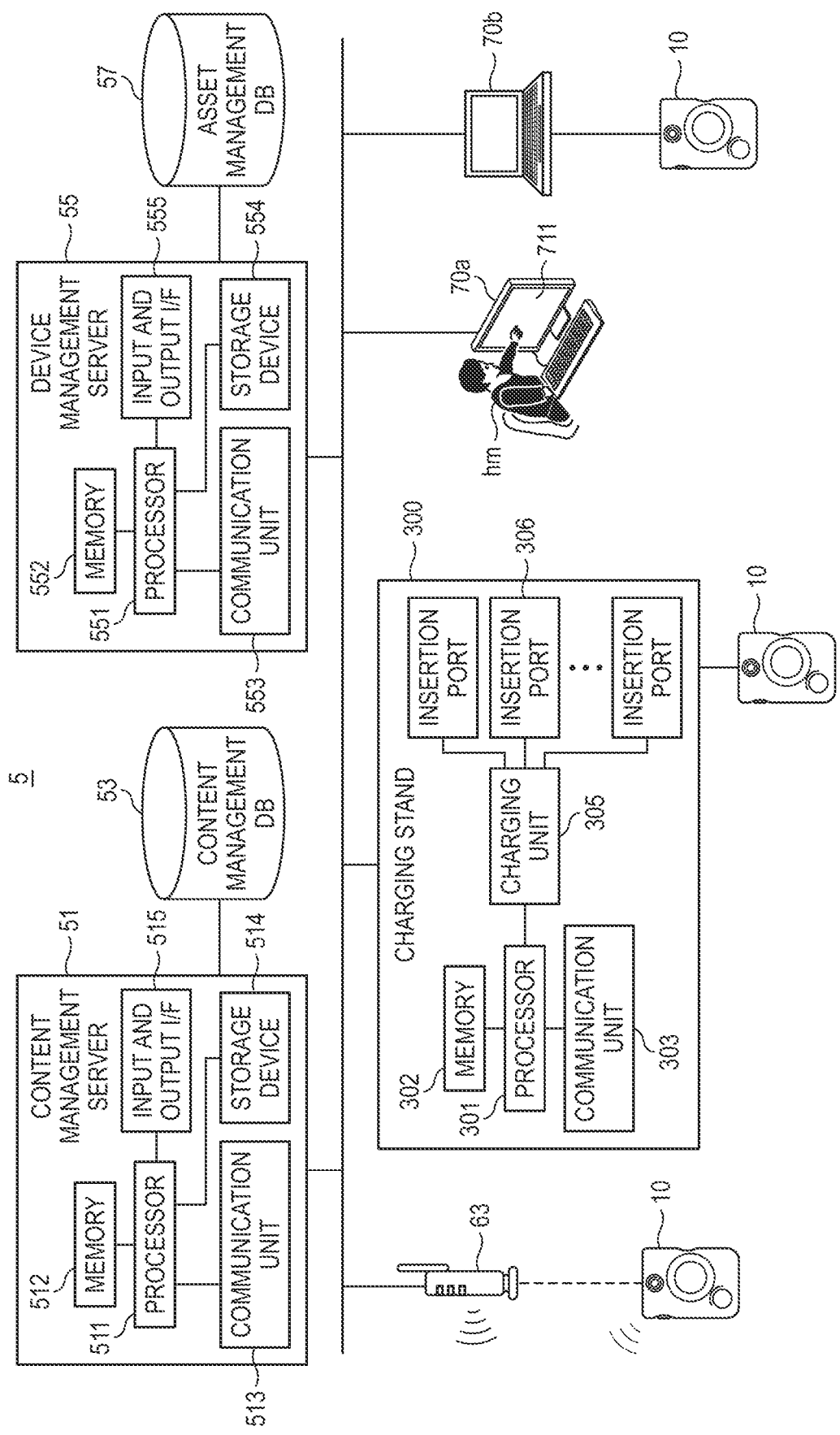
FIG. 2 is a diagram illustrating a configuration of an asset management system according to Embodiment 1.

FIG. 2 is a diagram illustrating a configuration of an asset management system 5 according to Embodiment 1. The asset management system 5 constitutes a part of the communication system 1000 illustrated in FIG. 1, and includes the wearable camera 10, the back end server 50 in a police department PD, the wireless LAN access point 63, the back end clients 70a and 70b, and the charging stand 300 as an example of the gang charger. The back end server 50 includes, for example, the content management server 51 (an example of a server) having a content management function and the device management server 55 (an example of a server) having a device management function. A content management database 53 is connected to the content management server 51. An asset management database 57 as an example of a database is connected to the device management server 55. Each of the content management database 53 and the asset management database 57 is stored in a storage such as a hard disk drive.

The content management server 51 manages, as a content, data of a video image which is obtained by image capturing with the wearable camera 10 and the in-car video system 30 and includes an evidence video of an incident. The content management server 51 is configured by a general-purpose computer, and includes a processor 511, a memory 512, a communication unit 513, a storage device 514, and an input and output interface 515. In this specification and the accompanying drawings, "the interface" may be abbreviated as "the OF". The storage device 514 is a storage capable of storing a large amount of data. The content management database 53 is connected to the input and output interface 515. The processor 511 updates and reads data registered in the content management database 53 through the input and output interface 515.

The content management database 53 accumulates a large amount of data of a video image obtained by image capturing with the wearable camera 10 and the in-car video system 30.

The device management server 55 manages the states and position information of the wearable camera 10 and the in-car video system 30. The device management server 55 is configured by a general-purpose computer and includes a processor 551, a memory 552, a communication unit 553, a storage device 554, and an input and output interface 555. The storage device 554 is a storage capable of storing a large amount of data. The asset management database 57 is connected to the input and output interface 555. The processor 551 updates and reads data registered in the asset management database 57 through the input and output interface 555.

The asset management database 57 registers the state and the position information of each of the wearable camera 10 and the in-car video system 30 in a table format. The state and the position information of each of the wearable camera 10 and the in-car video system 30, which are registered in the asset management database 57, are used for generating an asset management screen (see FIGS. 5 and 9). The state and the position information are reflected in the contents of a mail of which a notification is transmitted from the device management server 55 to the back end client 70a.

The charging stand 300 has an insertion port 306 on which multiple wearable cameras 10 can be placed, and charges the batteries 25 (see FIG. 3) of the respective wearable cameras 10 placed on insertion ports 306. The charging stand 300 has a function of performing a wired communication with the wearable camera 10 during charging and transmitting data of a video image stored in the wearable camera 10 to the content management server 51 of the back end server 50. The charging stand 300 has a function of transmitting a state change indicating that the wearable camera 10 is placed on the insertion port 306 or that the wearable camera 10 is removed from the insertion port 306, to the device management server 55. Further, the charging stand 300 has a function of transmitting the position information of the charging stand 300 to the device management server 55.

The charging stand 300 includes a processor 301, a memory 302, a communication unit 303, and a charging unit 305. Electrode terminals mounted on a plurality of insertion ports 306 are connected to the charging unit 305. The charging unit 305 detects and charges the wearable camera 10 placed on each of the insertion ports 306. The communication unit 303 performs a wired communication with the wearable camera 10 placed on the insertion port 306. The communication unit 303 performs a wired or wireless communication with the device management server 55.

Figure 3:
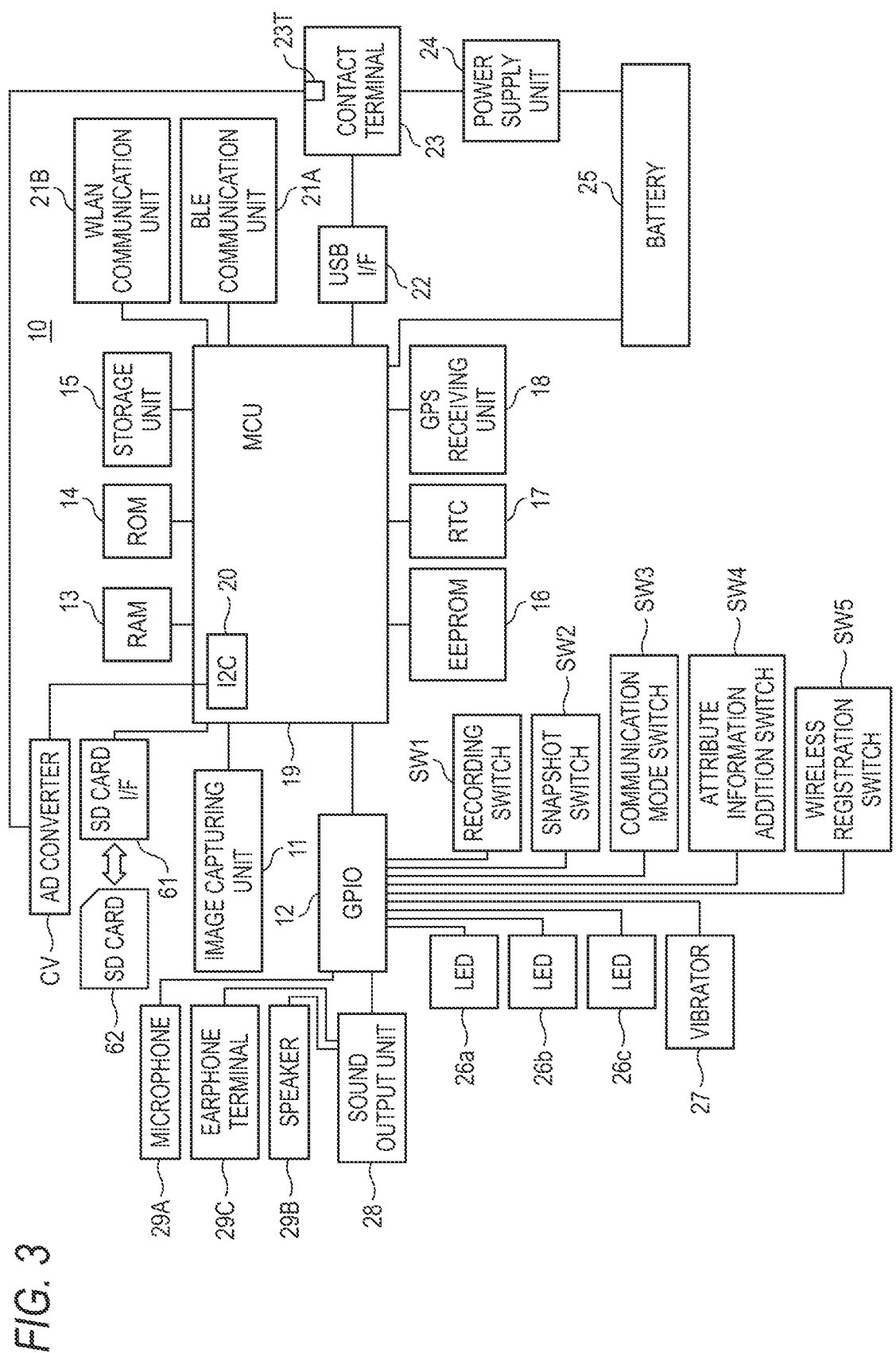
FIG. 3 is a block diagram illustrating a hardware configuration of a wearable camera.

FIG. 3 is a block diagram illustrating a hardware configuration of the wearable camera 10. The wearable camera 10 includes an image capturing unit 11, a GPIO 12, a random access memory (RAM) 13, a read only memory (ROM) 14, and a storage unit 15. The wearable camera 10 includes an electrically erasable programmable ROM (EEPROM) 16, a real time clock (RTC) 17, and a global positioning system (GPS) receiving unit 18. The wearable camera 10 includes a micro control unit (MCU) 19, a BLE communication unit 21A, a WLAN communication unit 21B, a USB interface 22, an SD card interface 61, a contact terminal 23, a power supply unit 24, and a battery 25.

The wearable camera 10 includes a recording switch SW1, a snapshot switch SW2, a communication mode switch SW3, an attribute information addition switch SW4, and a wireless registration switch SW5.

The wearable camera 10 includes three light emission diodes (LEDs) 26a, 26b, and 26c, a vibrator 27, a sound output unit 28, a microphone 29A, a speaker 29B, and an earphone terminal 29C. The LEDs 26a, 26b, 26c, the vibrator 27, and the sound output unit 28 function as an example of a notification unit that notifies the user.

The image capturing unit 11 includes an imaging lens and a solid-state imaging device including a charge coupled device (CCD) type image sensor or a complementary metal oxide semiconductor (CMOS) type image sensor. The image capturing unit 11 outputs data of a video image based on an image of a subject, which has been obtained by image capturing, to the MCU 19.

A detection terminal 23T of the contact terminal 23 is a terminal at which a voltage is changed in a case where the wearable camera 10 is placed (set) on the charging stand 200 or the gang charger or in a case where the wearable camera 10 is removed from the charging stand 200 or the gang charger. The detection terminal 23T of the contact terminal 23 is connected to an AD converter CV. A signal indicating the voltage change at the detection terminal 23T is converted into a digital signal by the AD converter CV, and the digital signal is input to the MCU 19 through an I2C 20.

The GPIO 12 is a parallel interface. The GPIO 12 is connected to the recording switch SW1, the snapshot switch SW2, the communication mode switch SW3, the attribute information addition switch SW4, the wireless registration switch SW5, the LEDs 26a, 26b and 26c, the vibrator 27, the sound output unit 28, the microphone 29A, the speaker 29B, and the earphone terminal 29C. The GPIO 12 inputs or outputs signals between the various electronic components and the MCU 19.

The microphone 29A picks up a sound around the wearable camera 10, and outputs sound data of the picked up sound to the MCU 19 through the GPIO 12. The microphone 29A may be a built-in microphone accommodated in a housing 10z of the wearable camera 10 or be a wireless microphone that is wirelessly connected to the wearable camera 10. In a case of the wireless microphone, it is possible to improve sound picking properties because a police officer attaches the wireless microphone to any location.

The sound output unit 28 outputs a sound signal related to an operation of the wearable camera 10 under an instruction of the MCU 19. The sound output unit 28 reads sound data having a sound of a predetermined message, which has been stored in advance in the ROM 14 or the like, and outputs a sound signal based on the sound data, from the speaker 29B as sound. The earphone terminal 29C outputs the sound signal output from the sound output unit 28 to an earphone connected to the earphone terminal 29C. The speaker 29B receives an input of the sound signal output by the sound output unit 28 and outputs the sound signal as sound.

The AD converter CV is connected to the MCU 19 through a communication interface such as the I2C (inter-integrated circuit) 20. Similar effects may be obtained even though the detection terminal 23T of the contact terminal 23 is connected to the GPIO 12 without passing through the AD converter CV.

The RAM 13 is a work memory used in the operation of the MCU 19, for example. The ROM 14 stores, for example, a program and data for controlling performing of an operation (processing) of the MCU 19, in advance.

The storage unit 15 is configured, for example, by a storage medium such as a memory card. The storage unit starts data recording (that is, video recording) of a video image captured by the image capturing unit 11, for example, based on an instruction to start video recording based on an operation of a police officer, or an instruction to start video recording from the common trigger box 100. The storage unit 15 normally pre-buffers and holds data of a video image during a predetermined time (for example, 30 seconds), which has been captured by the image capturing unit 11, and normally continues accumulation of data of a video image before a predetermined time (for example, 30 seconds) from the current time point. If the storage unit 15 receives an instruction to start video recording, the storage unit 15 starts recording of data of a video image and continuously records data of a video image until receiving an instruction to stop the video recording. The storage unit 15 has a setting data file in which resolution increase information and the like are set. For example, in a case where the storage unit 15 is configured by a memory card, the storage unit is removably mounted in the housing 10z of the wearable camera 10.

The EEPROM 16 stores, for example, identification information (for example, a serial number as a camera ID) for identifying the wearable camera 10 and various kinds of setting information. The RTC 17 counts the current time information and outputs a result of counting to the MCU 19.

The GPS receiving unit 18 receives satellite signals transmitted from a plurality of GPS transmitters (for example, four navigation satellites) and outputs the received satellite signal to the MCU 19. The satellite signal includes a signal transmission time point and position coordinates of each GPS transmitter. The MCU 19 calculates the current position coordinates of the wearable camera 10 and a reception time point of the satellite signal, by using a plurality of satellite signals. The calculation may be performed by the GPS receiving unit 18 instead of the MCU 19. The information on the reception time point may also be used for correcting the system time point (that is, the output of the RTC 17) of the wearable camera 10. The system time point is used, for example, for recording a capturing time point of a captured image (including a still image and a moving image).

The MCU 19 has a function as a control unit of the wearable camera 10. Thus, the MCU performs, for example, a control process of generally controlling the operation of each unit of the wearable camera 10, an input and output process of data from and to each unit of the wearable camera 10, an arithmetic (calculation) process of data, and a storing process of the data. The MCU 19 operates in accordance with various programs and various kinds of data stored in the ROM 14. During the operation, the MCU 19 uses the RAM 13 to obtain the current time point information from the RTC 17 and to obtain the current position information from the GPS receiving unit 18.

The BLE communication unit 21A performs a wireless communication with the smartphone 40, the common trigger box 100, and the like by using a communication mode of Bluetooth (registered trademark) Low Energy (BLE) which is a communication standard for short-range wireless communication. BLE is the name of version 4.0 of Bluetooth (registered trademark). In BLE, a communication is possible with low power consumption, but the communication speed is as low as about 100 kbps.

The WLAN communication unit 21B is connected to the smartphone 40 as a wireless LAN access point using a tethering function, the wireless LAN access point 45, the wireless LAN access point 63 of a wireless LAN available in the police department PD, or the like by a wireless LAN (that is, WLAN), and performs a wireless communication with a connection destination. The wireless LAN is capable of a high-speed communication at a communication speed of tens to hundreds of Mbps as compared with BLE. However, since a connection to a wireless LAN access point is normally performed, a large amount of power is consumed.

The wearable camera 10 has a configuration (not illustrated) of a communication unit that performs a short-range wireless communication such as a near field communication (NFC) or a wireless communication using a mobile network (for example, LTE), in addition to BLE communication or WLAN communication.

The USB interface 22 is a serial bus, and enables a connection with, for example, the in-car PC 32 and the back end client 70a or 70b in the police department PD.

The SD card 62 is removably connected to the SD card interface 61, and thus data of a video image is stored in the SD card 62 inserted into the SD card interface 61 in accordance with an instruction from the MCU 19. The SD card 62 has capacity of 16 G bytes and 32 G bytes, for example, and may store data of a video image obtained by image capturing of the wearable camera 10.

The contact terminal 23 is a terminal for being electrically connected to the charging stand 200. The contact terminal is connected to the MCU 19 through the USB interface 22, and is also connected to the power supply unit 24. The power supply unit 24 charges the battery 25 in response to a connection detection with the charging stand 200 at the contact terminal 23. At the contact terminal 23, a communication of data of a video image read from the storage unit 15 by the MCU 19 may be performed with an external device (for example, the common trigger box 100) connected through the charging stand 200, in response to the connection with the charging stand 200.

For example, "a charging terminal V+" (not illustrated), "a detection terminal 23T", "data terminals D− and D+" (not illustrated), and "a ground terminal" (not illustrated) are provided at the contact terminal 23. The detection terminal 23T is a terminal for detecting a voltage and a voltage change. The data terminals D− and D+ are terminals for transferring the data of a video image captured by the wearable camera 10 to the in-car PC 32, for example, through a USB connector terminal. The detection terminal 23T of the contact terminal 23 is connected to the communication interface such as the I2C 20 through the AD converter CV, and the detection voltage value of the contact terminal 23 is input to the MCU 19.

Because the contact terminal 23 and the connector of the charging stand 200 are connected to each other, data communication between the wearable camera 10 and an external device (for example, the common trigger box 100) is possible.

The power supply unit 24 charges the battery 25 by supplying a charging current thereto through the contact terminal 23, for example. The charging current is supplied by an external power supply (for example, the common trigger box 100, a cigar charger in a police vehicle 7, an accessory in the police vehicle 7) connected to the charging stand 200.

The battery 25 is configured by, for example, a rechargeable secondary battery, and supplies power supply power to each unit of the wearable camera 10. Because the wearable camera 10 is normally used in a recording state while going out, the power of the battery is drastically consumed. Therefore, the life of the battery 25 is short, for example, two years.

The recording switch SW1 is a push button switch for inputting an operation instruction to start or stop video recording (capturing a moving image) by a pressing operation of a police officer, for example. The MCU 19 may start recording (capturing a moving image) when, for example, the recording switch SW1 is pressed for a short time, and may end recording when the recording switch SW1 is pressed for a long time. The MCU 19 may start video recording (capturing a moving image) by pressing the recording switch SW1 an odd number of times, and may end video recording by pressing the recording switch SW1 an even number of times.

The snapshot switch SW2 is, for example, a push button switch for inputting an operation instruction to capture a still image by a pressing operation of a police officer. For example, every time the snapshot switch SW2 is pressed, the MCU 19 captures a still image when the snapshot switch SW2 is pressed.

The communication mode switch SW3 is, for example, a slide switch for inputting an operation instruction to set a communication mode between the wearable camera 10 and an external device. The communication mode includes, for example, an access point mode, a station mode, and an OFF mode.

The access point mode is a mode in which the wearable camera 10 operates as an access point of a wireless LAN, and is wirelessly connected to, for example, the smartphone 40 held by a police officer, and thus a communication between the wearable camera 10 and the smartphone 40 is performed. In the access point mode, the smartphone 40 may be connected to the wearable camera 10 to perform a display of the current live image, reproduction of a recorded image, a display of a captured still image, and the like by the wearable camera 10.

The station mode is a mode in which, in a case where the wearable camera is connected to an external device using a wireless LAN, the wearable camera performs a communication by using the external device as an access point. For example, the smartphone 40 may be set as the external device by using the tethering function of the smartphone 40. In the station mode, for example, the wearable camera 10 transfers (uploads) various settings, an image which has been held by the wearable camera 10 and has been recorded to the in-car video system 30, the back end client 70 or the back end server 50 in the police department.

The OFF mode is a mode in which the communication operation of the wireless LAN is turned OFF and the wireless LAN is set to be unused.

The attribute information addition switch SW4 is a push button switch operated to add attribute information to data of a video image. The attribute information indicates the content (for example, type of case, murder, robbery, or disaster) of a video image captured by the wearable camera 10.

The wireless registration switch SW5 is a push button switch operated when the wearable camera 10 registers and sets (may be referred to as "a communication setting process" below) an external device (for example, the smartphone 40, the wireless LAN access point 45, and the common trigger box 100) as a partner with which the wearable camera 10 performs a wireless communication (for example, a wireless communication using BLE or a wireless LAN), as a communication partner. A process of registering and setting a device as a communication partner, for example, in a wireless communication using BLE may be referred to as "pairing" below.

The LED 26a is a display unit that indicates, for example, a power-on state (ON or OFF state) of the wearable camera 10 and the state of the battery 25.

The LED 26b is a display unit that indicates, for example, a state (recording state) of a capturing operation of the wearable camera 10.

The LED 26c is a display unit that indicates the state of the wearable camera 10 in the communication mode, for example. If the wearable camera 10 receives notification data from the back end server 50, the three LEDs 26a to 26c perform a blinking operation in accordance with an instruction from the MCU 19. At this time, the MCU 19 changes a blinking pattern of the LEDs 26a to 26c in accordance with information regarding a sound source, which is included in the notification data.

The MCU 19 detects the input of each of the recording switch SW1, the snapshot switch SW2, the communication mode switch SW3, the attribute information addition switch SW4, and the wireless registration switch SW5, and performs a process on an input from the operated switch.

In a case where the MCU 19 detects an operation input of the recording switch SW1, the MCU 19 controls the start or stop of the image capturing operation in the image capturing unit 11 and stores an image obtained from the image capturing unit 11 in the storage unit 15 as a moving image.

In a case where the MCU 19 detects an operation input of the snapshot switch SW2, the MCU 19 stores an image obtained by the image capturing unit 11 when the snapshot switch SW2 is operated, in the storage unit 15 as a still image.

The MCU 19 detects the state of the communication mode switch SW3 and operates the communication unit 21 in the communication mode according to the setting of the communication mode switch SW3.

In a case where the attribute information addition switch SW4 is pressed, the MCU 19 adds the attribute information corresponding to the data of a video image captured by the image capturing unit 11, in association with the video image.

In a case where the wireless registration switch SW5 is pressed, the MCU 19 performs a default process required to be performed in a communication setting process (for example, pairing), for a peripheral external device (for example, the common trigger box 100) which may be a communication partner of the wearable camera 10. Here, if pairing is exemplified, the default process includes generation of registration request information as a communication partner of a wireless communication and an output to the BLE communication unit 21A, generation of connection information for specifying a communication partner as a connection destination and an output to the BLE communication unit 21A, and storing of the connection information transmitted from the communication partner in the storage unit 15. The default process for communication setting of the wireless LAN is similar to the default process when the above-described pairing is exemplified.

Next, an operation example of the asset management system 5 according to Embodiment 1 will be described.

Operation Example 1 represents a case of managing the state of the wearable camera 10. Operation Example 2 represents a case of managing the position of the wearable camera 10.

Operation Example 1

As a background, the handling of the wearable camera 10 is different depending on the police officer. As long as the wearable camera is carefully handled, no abnormality, in particular, such as failure occurs. However, in a case where the wearable camera 10 is handled roughly, for example, is thrown, the wearable camera 10 may have failure. While the police officer is out, the wearable camera 10 may be continuously used in a recording state by an operation of the police officer. Therefore, the battery of the wearable camera held by a police officer who frequently goes out is consumed so much, and thus the life of the battery tends to be shortened. From such circumstances, it is desired that the wearable camera be normally managed in a normal usable state, as an important device that records an evidence video image of an incident.

Pattern 1 of Operation Example 1

Figure 4:
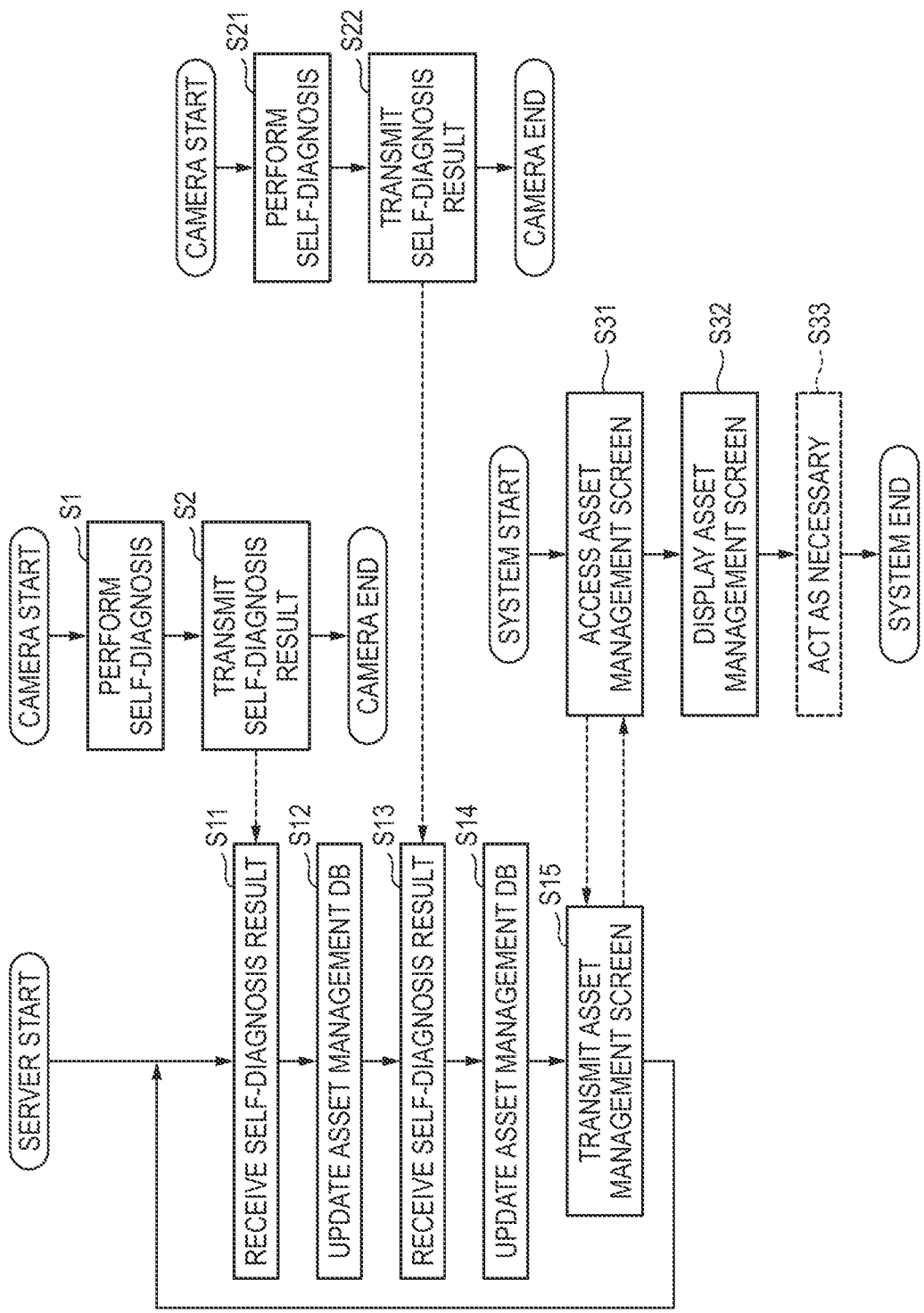
FIG. 4 is a flowchart illustrating an abnormality detection procedure of the asset management system in Pattern 1 of Operation Example 1.

FIG. 4 is a flowchart illustrating an abnormality detection procedure of the asset management system 5 in Pattern 1 of Operation Example 1. In Pattern 1 of the Operation Example 1, in a case where a system administrator makes a request, the state of the wearable camera 10 is checked.

The MCU 19 of the wearable camera 10 repeatedly performs self-diagnosis at startup or at predetermined time intervals (S1). The types of abnormalities in which the wearable camera 10 is assumed to be likely to be abnormal are registered in the storage unit 15 in advance. Examples of the types of abnormalities include a battery, an SD card, a communication module, and other hardware in descending order of frequency. In the self-diagnosis, it is determined whether the battery, SD card, communication module, other hardware, and the like are normal or abnormal, based on data regarding the battery, SD card, communication module, other hardware, and the like. The data regarding the battery includes not only the number of times of charging, the remaining capacity, the use period, and the like, but also the battery life based on these kinds of data. The data regarding the SD card includes not only the number of times of writing, the storage capacity, the use period, and the like, but also the necessity of replacement based on these kinds of data. The data regarding the communication module includes a state of whether or not a communication is possible in accordance with each communication method such as wireless LAN and BLE. The data regarding the hardware includes whether or not an electronic component such as a memory (such as a RAM), a camera, or a microphone has failure.

The MCU 19 transmits data (self-diagnosis result data) including a self-diagnosis result to the device management server 55 through the WLAN communication unit 21B or the BLE communication unit 21A (S2). The self-diagnosis result data includes a device identifier, a time point, and a diagnosis result. Then, the MCU 19 ends this processing.

The processor 551 in the device management server 55 receives the self-diagnosis result data transmitted from the wearable camera 10 through the communication unit 553 (S11). The processor 551 updates the asset management database 57 connected to the input and output interface 555 based on the self-diagnosis result data (S12).

Similarly, the MCU 19 in the same or another wearable camera 10 repeatedly performs self-diagnosis at startup or at predetermined time intervals, at different timings (S21). The MCU 19 transmits the data (self-diagnosis result data) including the self-diagnosis result to the device management server 55 through the WLAN communication unit 21B or the BLE communication unit 21A (S22). Then, the MCU 19 ends this processing.

The processor 551 in the device management server 55 receives the self-diagnosis result data transmitted from the same or another wearable camera 10 through the communication unit 553 (S13). The processor 551 updates the asset management database 57 connected to the input and output interface 555 based on the self-diagnosis result data (S14).

A system administrator hm performs an operation of requesting an asset management screen from the back end client 70a. The back end client 70a requests the device management server 55 to display the asset management screen (S31).

Figure 5:
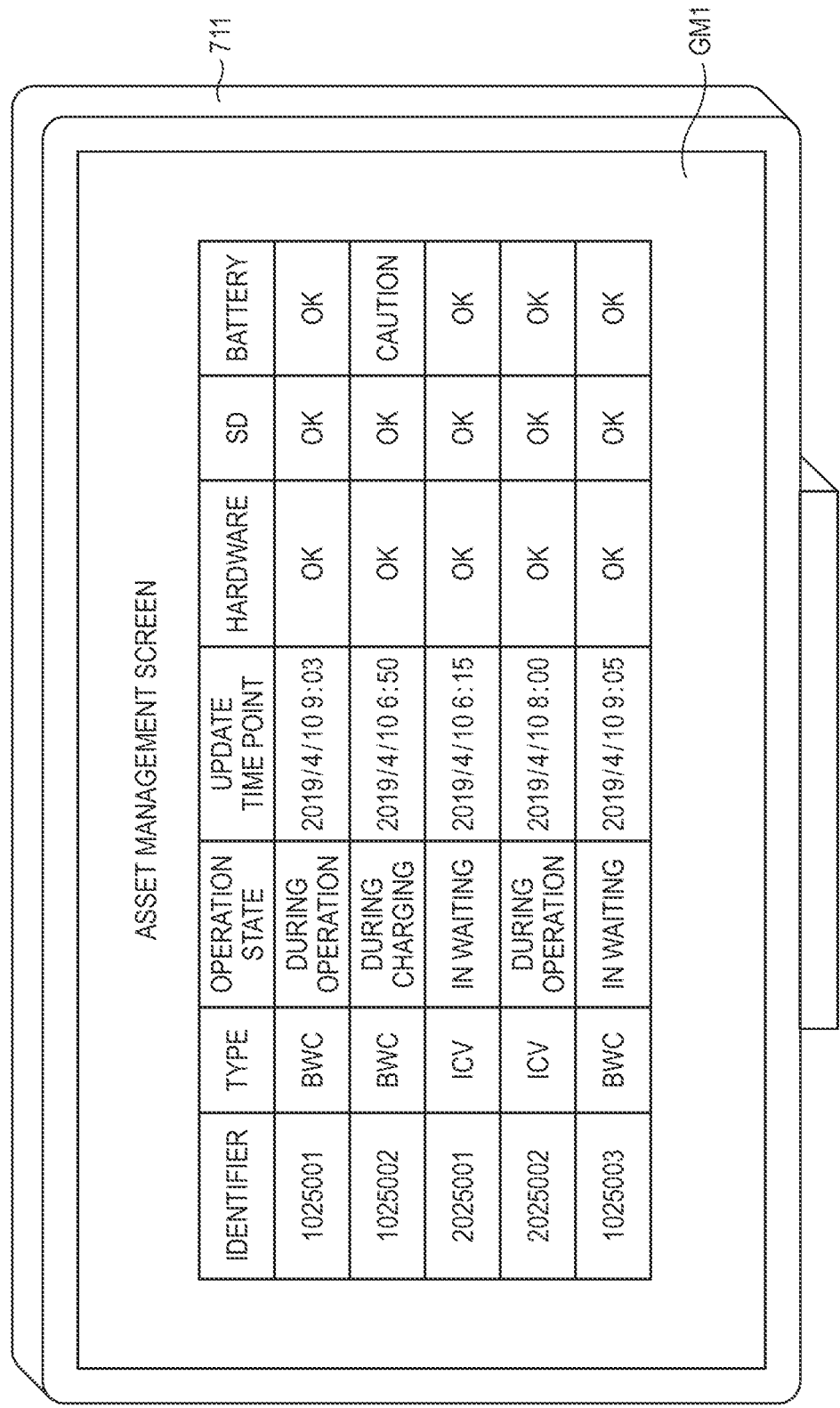
FIG. 5 is a diagram illustrating an asset management screen.

In response to this request, the processor 551 in the device management server 55 accesses the asset management database 57 to acquire the data, and generates an asset management screen GM1 (see FIG. 5). The processor 551 transmits data of the generated asset management screen to the back end client 70a through the communication unit 553 (S15). Then, the processor 551 causes the process to return to Step S11.

If the back end client 70a receives asset management screen data from the device management server 55, the back end client 70a displays the asset management screen on a display 711 (S32). Here, a case where the system administrator causes the asset management screen to be displayed on the display 711 of the back end client 70a is described. However, in a case where the display is connected to the device management server 55, the system administrator may cause the asset management screen to be displayed on the display of the device management server 55.

The system administrator hm looks at the asset management screen GM1 and takes an appropriate action as necessary (S33). For example, in a case where "Caution" is displayed for the battery item in the asset management screen GM1, the system administrator hm performs the action of charging or replacing the battery of the corresponding wearable camera 10. The system administrator hm may instruct a police officer who holds the wearable camera 10 to charge or replace the wearable camera 10.

If the system administrator hm checks the asset management screen GM1, the back end client 70a ends the operation. This check may correspond to a predetermined input operation by the system administrator hm, or may correspond to a display end after a predetermined time has elapsed.

FIG. 5 is a diagram illustrating the asset management screen GM1. The asset management screen GM1 is displayed on the display 711 of the back end client 70a. The asset management screen GM1 is represented in a table format and includes items of an identifier, a type, an operation state, an update time point, hardware, an SD and a battery. The hardware, the SD card, and the battery correspond to the types of abnormalities in which abnormalities are assumed to be likely to occur. The asset management screen may include a communication module as an item. The data of these items is registered in the asset management database 57. In a case of the wearable camera 10, for example, the identifier is 1025002, the type is BWC, the operation state is charging, the update time point is 2019/4/10 6:50, the hardware is OK, the SD is OK, and the battery is Caution. Here, when a warning of "Caution" is displayed in the battery item, a link is attached to the display portion of "Caution". When the system administrator hm selects the display portion of "Caution" with a finger or a cursor, the detailed information of "Caution", for example, data on the remaining battery amount, the number of times of charging, and the available time is displayed on the display 711 of the back end client 70a. In a case of the in-car video system 30, for example, the identifier is 2025001, the type is ICV, the operation state is standby, the update time point is 2019/4/10 6:15, the hardware is OK, the SD is OK, and the battery is OK. The hardware item may include the state of the wireless LAN.

In Pattern 1 of Operation Example 1, the device management server 55 transmits the asset management screen data to the back end client 70a in response to the request from the back end client 70a. Thus, the system administrator hm can check the state of the wearable camera 10 at any time.

Pattern 2 of Operation Example 1

Figure 6:
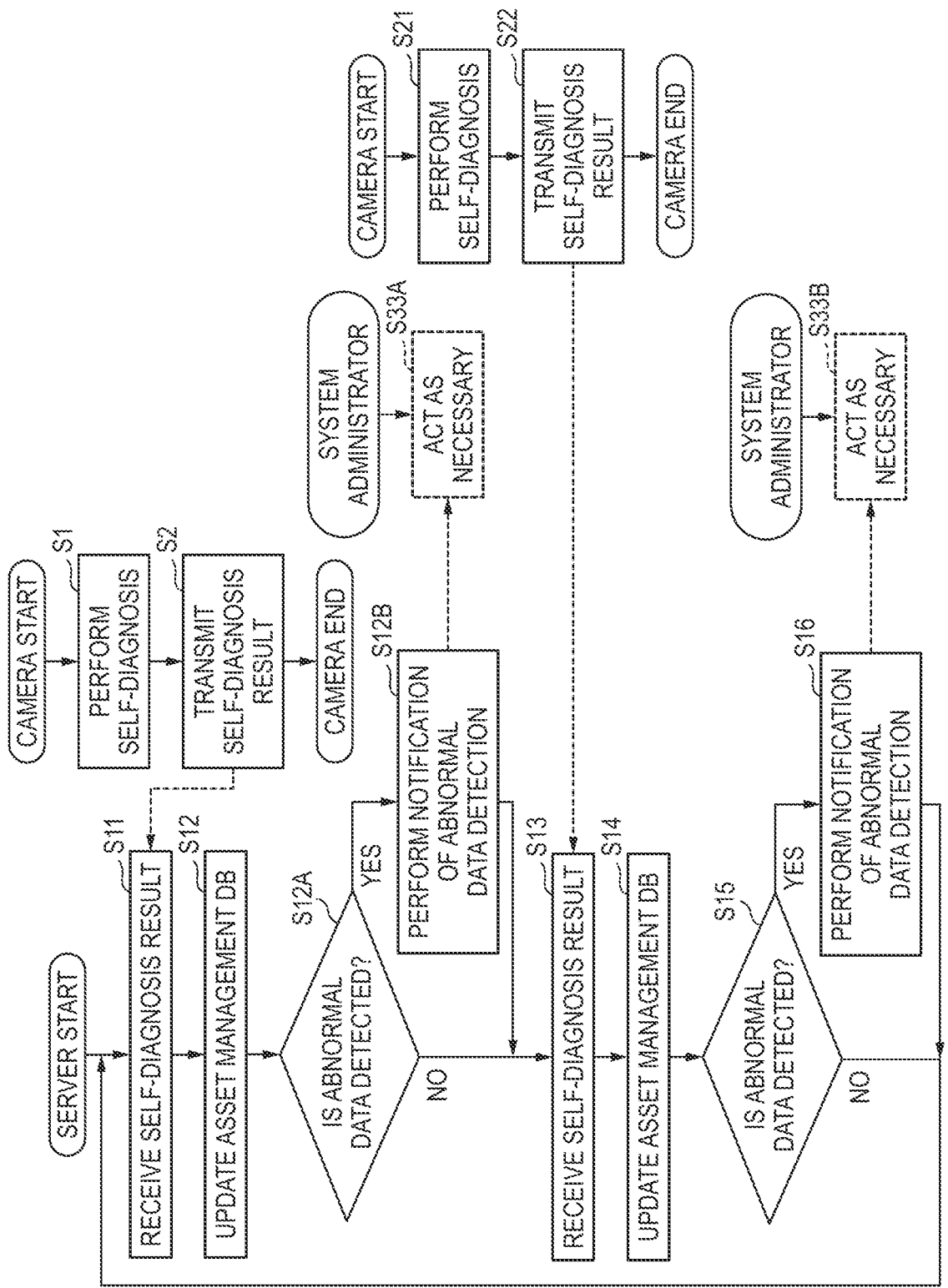
FIG. 6 is a flowchart illustrating an abnormality detection procedure of the wearable camera in Pattern 2 of Operation Example 1.

FIG. 6 is a flowchart illustrating an abnormality detection procedure of the wearable camera in Pattern 2 of Operation Example 1. In Pattern 1 of Operation Example 1, in a case where the system administrator hm intends to check the state of the wearable camera 10, the system administrator hm operates the back end client 70a to request the asset management screen from the device management server 55. In Pattern 2 of Operation Example 1, in a case where the asset management database 57 is updated, and abnormal data is found in the asset management database 57, the device management server 55 notifies the back end client 70a that an abnormality has been detected.

In Pattern 2 of Operation Example 1, the same step number is attached to the same step process as that in Pattern 1 of Operation Example 1. Specifically, the processes of Steps S1, S2, S11, S12, S13, and S14 are the same.

The MCU 19 of the wearable camera 10 repeatedly performs self-diagnosis at startup or at predetermined time intervals (S1). The MCU 19 transmits data (self-diagnosis result data) including a self-diagnosis result to the device management server 55 through the WLAN communication unit 21B or the BLE communication unit 21A (S2). Then, the MCU 19 ends this processing.

The processor 551 in the device management server 55 receives the self-diagnosis result data transmitted from the wearable camera 10 through the communication unit 553 (S11). The processor 551 updates the asset management database 57 connected to the input and output interface 555 based on the self-diagnosis result data (S12).

The processor 551 determines whether or not abnormal data has been detected in the asset management database 57 updated in Step S12 (S12A). In a case where no abnormal data has been detected, the processor 551 proceeds to the process of Step S13, similar to Pattern 1 of Operation Example 1.

In a case where the abnormal data has been detected in Step S12A, the processor 551 notifies the back end client 70a of a mail indicating that there is abnormal data, and urges the system administrator hm to check the state (S12B). This mail contains information on a device identifier, a time point, details of abnormality, and the like. The system administrator hm confirms the content of the mail of which the notification is transmitted to the back end client 70a and takes an appropriate action as necessary (S33A). For example, in a case where the content of the mail includes "Caution" for the battery, the system administrator hm performs the action of charging or replacing the battery of the corresponding wearable camera 10. The system administrator hm may instruct a police officer who holds the wearable camera 10 to charge or replace the wearable camera 10.

Similarly, the MCU 19 in the same or another wearable camera 10 repeatedly performs self-diagnosis at startup or at predetermined time intervals, at different timings (S21). The MCU 19 transmits the data (self-diagnosis result data) including the self-diagnosis result to the device management server 55 through the WLAN communication unit 21B or the BLE communication unit 21A (S22). Then, the MCU 19 ends this processing.

The processor 551 in the device management server 55 receives the self-diagnosis result data transmitted from the same or another wearable camera 10 through the communication unit 553 (S13). The processor 551 updates the asset management database 57 connected to the input and output interface 555 based on the self-diagnosis result data (S14).

Similarly, the processor 551 in the device management server 55 determines whether or not abnormal data has been detected in the asset management database 57 updated in Step S14 (S15). In a case where no abnormal data has been detected, the processor 551 returns to the process of Step S11, similar to Pattern 1 of Operation Example 1.

In a case where the abnormal data has been detected in Step S12A, the processor 551 notifies the back end client 70a of a mail indicating that there is abnormal data, and urges the system administrator hm to check the state (S16). This mail contains information on a device identifier, a time point, details of abnormality, and the like. The system administrator hm confirms the content of the mail of which the notification is transmitted to the back end client 70a and takes an appropriate action as necessary (S33B).

Figure 7:
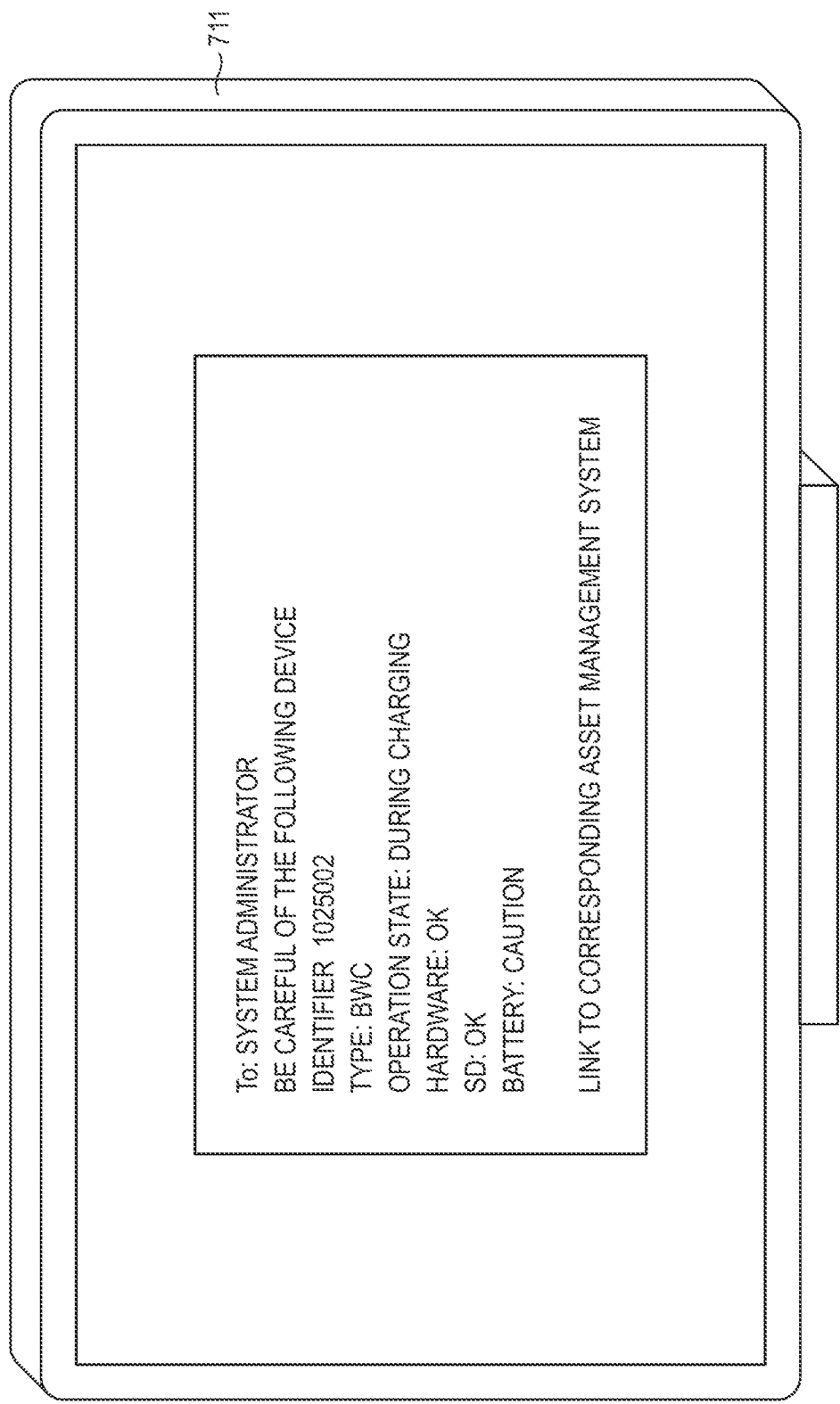
FIG. 7 is a diagram illustrating contents of a mail.

FIG. 7 is a diagram illustrating the content of the mail. The content of the mail is displayed on the display 711 of the back end client 70a. As an example, the content of the mail includes "To: system administrator" at the top, which indicates that the destination of the mail is the system administrator. In addition, "identifier: 1025002, type: BWC, operation state: Charging, hardware: OK, SD: OK, battery: Caution" is included after a comment indicating that "Be careful of the following devices". At the bottom of the screen of the display 711, link characters of "Link to the corresponding asset management system" are pasted. If the system administrator hm clicks a display portion of the link characters by selecting the display portion of the link characters with a finger or a cursor, the asset management system 5 is accessed.

In Pattern 2 of Operation Example 1, in a case where the wearable camera 10 has failure, the device management server 55 notifies the system administrator hm by mail. The system administrator hm can notice the abnormality of the wearable camera 10 without delay. In addition, it is possible to save the trouble of the system administrator hm managing the wearable camera 10.

As described above, in Operation Example 1, the device management server 55 can centrally manage the states of the plurality of wearable cameras 10. The system administrator hm can check the states of all wearable cameras 10. The system administrator hm can take measures to restore the state of the wearable camera to a normal state, if necessary. In addition, in the asset management system, it is possible to visualize the life of the battery, the SD card, or the like of the wearable camera. Further, the device management server 55 can manage information on illegal use or the like in addition to the abnormality of the wearable camera 10.

As described above, in the asset management system 5 according to Embodiment 1, the wearable camera 10 mountable by a police officer and the device management server 55 that manages information regarding the wearable camera 10 are connected to enable a communication. The wearable camera 10 repeatedly diagnoses whether or not the wearable camera has failure at a predetermined timing, and notifies the device management server 55 (server) of the diagnosis result. The device management server 55 is connected to the asset management database 57 that accumulates the diagnosis result of the wearable camera 10. The device management server 55 stores the diagnosis result of the wearable camera 10 in the asset management database 57 every time the device management server receives the diagnosis result. The device management server 55 displays the diagnosis result of the wearable camera 10 on the back end client 70a (an example of an external terminal).

Thus, in the asset management system 5, it is possible to regularly determine whether or not the wearable camera 10 used in the daily work of the police has failure and to appropriately manage the wearable camera 10, and thus it is possible to suppress deterioration of the business efficiency of a police officer.

In the asset management system 5, a plurality of wearable cameras 10 are provided. Each of the wearable cameras 10 notifies the device management server 55 of the diagnosis result of whether or not the wearable camera has failure. The device management server 55 accumulates the diagnosis result from each of the wearable cameras 10 in the asset management database 57 in association with the corresponding BWC identifier (an example of identification information of the wearable camera). Thus, the asset management system 5 can manage the states of the plurality of wearable cameras 10.

In the asset management system 5, the device management server 55 displays the diagnosis result of the wearable camera 10 on the display 711 of the back end client 70a in response to the access from the back end client 70a. Thus, the system administrator hm who operates the back end client 70a can visually check the state of the wearable camera 10.

In the asset management system 5, in a case where the device management server 55 determines that the diagnosis result of the wearable camera 10 includes abnormal data, the device management server 55 notifies the back end client 70a of a mail including the detection of the abnormal data. The back end client 70a displays the content of the mail including the detection of the abnormal data on the display 711. Accordingly, the system administrator hm can notice the abnormality of the wearable camera 10 without delay. In addition, it is possible to save the trouble of the system administrator hm managing the state of the wearable camera 10.

In the asset management system 5, the device management server 55 displays data including whether or not the battery 25 built in the wearable camera 10 or an external recording medium (for example, the SD card 62) inserted into the wearable camera 10 has failure, and an update time point of the diagnosis result, on the display 711 of the back end client 70a, in particular, in a table format including the items of the types of abnormalities likely to be caused by the wearable camera 10, as the diagnosis result of the wearable camera 10. Thus, the system administrator hm can quickly recognize the abnormality of the wearable camera 10.

In addition, in the asset management system 5, the device management server 55 displays the details of the corresponding abnormality in response to the operation on a display region indicating implication of abnormality in the battery 25 or the external recording medium (for example, the SD card 62), from the back end client 70a. Accordingly, it is possible to cause the system administrator hm to immediately know the details of the abnormality.

Operation Example 2

As a background of Operation Example 2, a point that the wearable camera is small and is easily carried, and thus the wearable camera is likely to be lost is exemplified. It is desirable to normally manage the whereabouts of the wearable camera such that a police officer can carry the wearable camera immediately when the police officer rushes to the scene of the incident.

Pattern 1 of Operation Example 2

Figure 8:
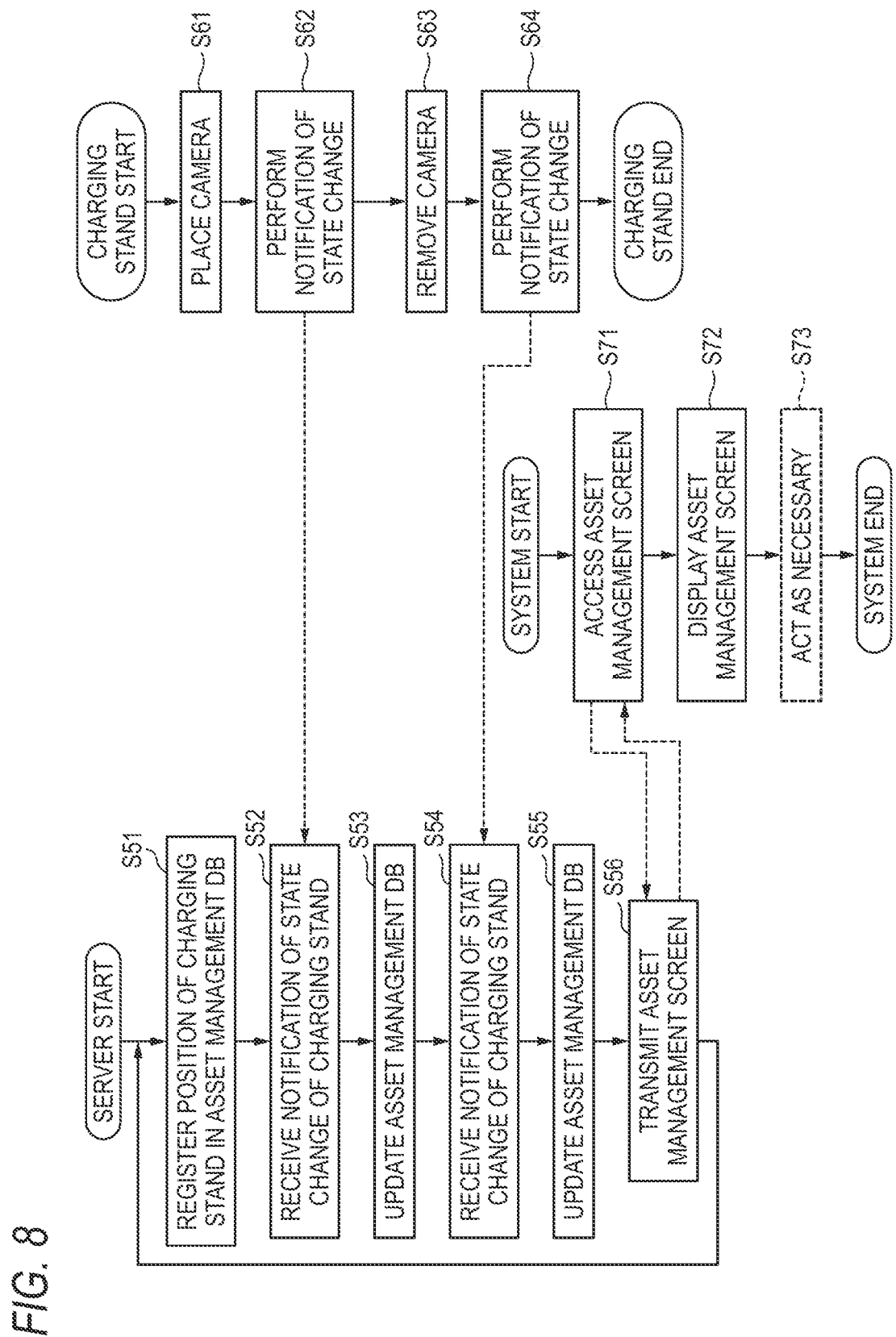
FIG. 8 is a flowchart illustrating a position management procedure of the wearable camera in Pattern 1 of Operation Example 2.

FIG. 8 is a flowchart illustrating a position management procedure of the wearable camera 10 in Pattern 1 of Operation Example 2. Pattern 1 of Operation Example 2 represents a case where the charging stand notifies the device management server of the position information of the wearable camera.

One or a plurality of charging stands 300 are installed at a predetermined location of the police department. The processor 551 in the device management server 55 registers the position information of the charging stand 300 in the asset management database 57 in advance (S51). The position information includes a branch office, a building, a floor, and the like of the police department, in which the charging stand 300 is installed.

Firstly, a situation in which a police officer places the wearable camera 10 on the insertion port 306 of the charging stand 300 is assumed. The processor 301 in the charging stand 300 detects that the wearable camera 10 is placed on the insertion port 306 (S61). The charging unit 305 normally monitors the voltage of the electrode terminal of the insertion port 306. If the wearable camera 10 is placed on the insertion port 306, the terminal of the battery 25 in the wearable camera 10 is connected to the electrode terminal of the insertion port 306, and thus the terminal voltage at the electrode terminal of the insertion port 306 changes. The processor 301 detects the placement of the wearable camera 10 based on the change in the terminal voltage of the electrode terminal, communicates with the wearable camera 10 through the communication unit 303, and acquires a BWC identifier of the wearable camera 10.

The processor 301 notifies the device management server 55 of information (an example of a first state change signal) including a state change of the charging stand 300, which is obtained by the wearable camera 10 being placed (S62). The information includes an Internet protocol (IP) address, a media access control (MAC) address, a BWC identifier, and a Bay number of the charging stand. The Bay number is the number of the insertion port. Either the IP address or the MAC address may be provided.

The processor 551 in the device management server 55 receives the notification of the state change of the charging stand 300 (first state change signal) (S52). The processor 551 updates the asset management database 57 based on the notification (S53).

Next, a situation in which the police officer removes the wearable camera 10 from the charging stand 300 is assumed. The processor 301 in the charging stand 300 detects that the wearable camera 10 has been removed from the insertion port 306 (S63). If the wearable camera 10 is removed from the insertion port 306, the terminal voltage of the electrode terminal of the insertion port 306, to which the battery 25 of the wearable camera 10 has been connected, changes. The processor 301 detects the removal of the wearable camera 10 based on the change in the terminal voltage of the electrode terminal.

The processor 301 notifies the device management server 55 of information (an example of a second state change signal) including a state change of the charging stand 300, which is obtained by the wearable camera 10 being removed (S64). The information includes the IP address, the MAC address, the BWC identifier, and the Bay number of the charging stand. Either the IP address or the MAC address may be provided.

The processor 551 in the device management server 55 receives the notification of the state change of the charging stand 300 (second state change signal) (S54). The processor 551 updates the asset management database 57 based on the notification (S55).

A system administrator hm performs an operation of requesting an asset management screen from the back end client 70a. The back end client 70a requests the device management server 55 to display the asset management screen (S71).

Figure 9:
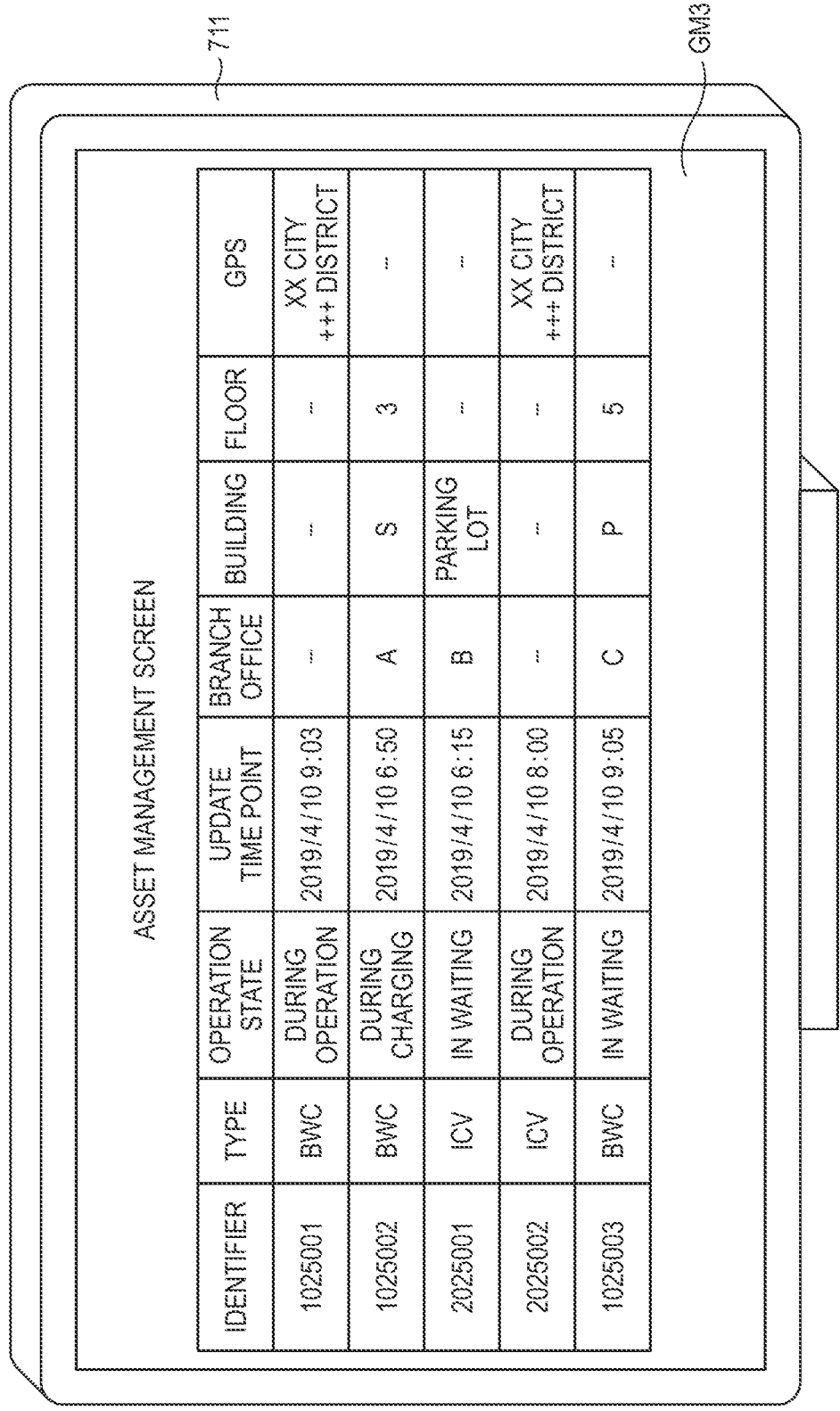
FIG. 9 is a diagram illustrating an asset management screen GM3.

In response to this request, the processor 551 in the device management server 55 accesses the asset management database 57 to acquire the data, and generates an asset management screen GM3 (see FIG. 9). The processor 551 transmits data of the generated asset management screen to the back end client 70a through the communication unit 553 (S56). Then, the processor 551 causes the process to return to Step S51.

If the back end client 70a receives asset management screen data from the device management server 55, the back end client 70a displays the asset management screen on a display 711 (S72). Here, a case where the system administrator causes the asset management screen to be displayed on the display 711 of the back end client 70a is described. However, in a case where the display is connected to the device management server 55, the system administrator may cause the asset management screen to be displayed on the display of the device management server 55.

The system administrator hm looks at the asset management screen GM3 and takes an appropriate action as necessary (S73).

FIG. 9 is a diagram illustrating the asset management screen GM3. The asset management screen GM3 is displayed on the display 711 of the back end client 70a. The asset management screen GM3 is represented in a table format and includes items of an identifier, a type, an operation state, an update time point, a branch office, a building, a floor, and a GPS. In a case of the wearable camera 10, for example, the identifier is 1025002, the type is BWC, the operation state is charging, the update time point is 2019/4/10 6:50, the branch office is A, the building is S, the floor is 3, and the GPS is none. In a case of the in-car video system 30, for example, the identifier is 2025001, the type is ICV, the operation state is standby, the update time point is 2019/4/10 6:15, the branch office is B, the building is parking lot, the floor is none, and the GPS is none. In the example, it is registered that the in-car video system 30 waits in the parking lot. In this case, a router or a wireless LAN access point that connects the in-car video system 30 to the network is provided in the parking lot.

In Pattern 1 of Operation Example 2, in the police department, the charging stand 300 assumed to leave the wearable camera 10 for a long time notifies the device management server 55 of the position information of the wearable camera 10. Accordingly, the device management server 55 can easily manage the position of the wearable camera 10 in the police department.

Pattern 2 of Operation Example 2

In Pattern 2 of Operation Example 2, a case where, when the wearable camera is placed on the charging stand or removed from the charging stand, the wearable camera notifies the device management server of the state change of the wearable camera and notifies the device management server of the position of the wearable camera will be described.

Figure 10:
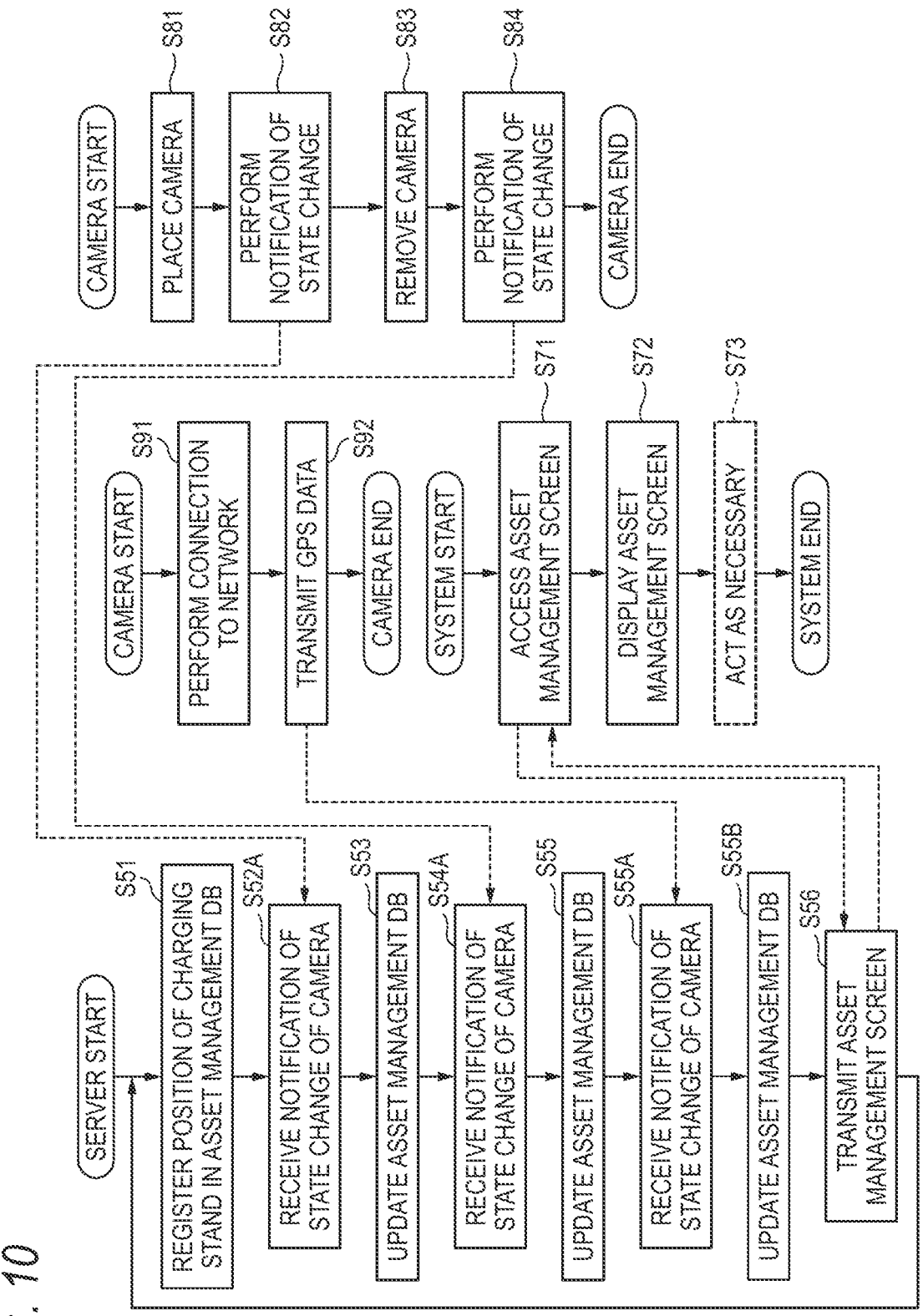
FIG. 10 is a flowchart illustrating a position management procedure of the wearable camera in Pattern 2 of Operation Example 2.

FIG. 10 is a flowchart illustrating the position management procedure of the wearable camera 10 in Pattern 2 of Operation Example 2. In Pattern 2 of Operation Example 2, the same step number is attached to the same step process as that in Pattern 1 of Operation Example 2.

The processor 551 in the device management server 55 registers the position information of the charging stand 300 in the asset management database 57 in advance (S51). Firstly, a situation in which a police officer places the wearable camera 10 on the insertion port 306 of the charging stand 300 is assumed. The MCU 19 in the wearable camera 10 detects that the wearable camera 10 is placed on the insertion port 306 (S81). If the wearable camera 10 is placed on the insertion port 306, the voltage at the detection terminal 23T of the contact terminal 23 of the wearable camera 10 changes. The MCU 19 detects the placement of the wearable camera 10 based on the change of the voltage at the detection terminal 23T and acquires the information of the charging stand 300. The information includes the IP address, the MAC address, the BWC identifier, and the Bay number of the charging stand. Either the IP address or the MAC address may be provided.

The MCU 19 notifies the device management server 55 of information including the state change of the wearable camera 10 (S82).

The processor 551 in the device management server 55 receives the notification of the state change of the wearable camera 10 (S52A). The processor 551 updates the asset management database 57 based on the notification (S53).

Next, a situation in which the police officer removes the wearable camera 10 from the charging stand 300 is assumed. The MCU 19 in the wearable camera 10 detects that the wearable camera 10 is removed from the insertion port 306 (S83). If the wearable camera 10 is removed from the insertion port 306, the voltage at the detection terminal 23T of the contact terminal 23 of the wearable camera 10 changes. The MCU 19 detects the removal of the wearable camera 10 based on the change in the voltage of the detection terminal 23T.

The MCU 19 notifies the device management server 55 of information including the state change of the wearable camera 10 (S84). The information includes the IP address, the MAC address, the BWC identifier, and the Bay number of the charging stand. The information may include either the IP address or the MAC address.

The processor 551 in the device management server 55 receives the notification of the state change of the wearable camera 10 (S54A). The processor 551 updates the asset management database 57 based on the notification (S55).

After the wearable camera 10 is removed from the charging stand 300 in Step S83, the position information of the charging stand 300 is not valid as the position information of the wearable camera 10. Therefore, the wearable camera 10 needs to acquire GPS data by the GPS receiving unit 18 and transmit GPS position information to the device management server 55.

The MCU 19 in the wearable camera 10 intends to be connected to the smartphone 40 or the wireless LAN access point 45 through the WLAN communication unit 21B or the BLE communication unit 21A. Further, the MCU intends to be connected to the network NW1, and be capable of communicating with the device management server 55 (S91). The wearable camera 10 may be connected to the in-car video system 30 through the WLAN communication unit 21B or the BLE communication unit 21A, be further connected to the network NW1, and be capable of communicating with the device management server 55.

The MCU 19 acquires GPS data by the GPS receiving unit 18, and transmits GPS position information to the device management server 55 through the WLAN communication unit 21B or BLE communication unit 21A (S92). The GPS position information includes a BWC identifier, a time point, and GPS data. The MCU 19 may transmit the GPS position information to the device management server 55 with passing through the in-car video system 30.

The processor 551 in the device management server 55 receives the GPS position information from the wearable camera 10 (S55A). The processor 551 updates the asset management database 57 based on the received GPS position information (S55B). Then, the processor 551 performs the processes subsequent to Step S56, similar to Pattern 1 of Operation Example 2. The processes subsequent to Step S71 by the back end client 70a are the same as those in Pattern 1 of Operation Example 2.

A system administrator hm performs an operation of requesting an asset management screen from the back end client 70a. The back end client 70a requests the device management server 55 to display the asset management screen (S71).

In response to this request, the processor 551 in the device management server 55 accesses the asset management database 57 to acquire the data, and generates an asset management screen GM3. The processor 551 transmits data of the generated asset management screen to the back end client 70a through the communication unit 553 (S56). Then, the processor 551 causes the process to return to Step S51.

If the back end client 70a receives asset management screen data from the device management server 55, the back end client 70a displays the asset management screen on a display 711 (S72). Here, a case where the system administrator causes the asset management screen to be displayed on the display 711 of the back end client 70a is described. However, in a case where the display is connected to the device management server 55, the system administrator may cause the asset management screen to be displayed on the display of the device management server 55.

The system administrator hm looks at the asset management screen GM3 and takes an appropriate action as necessary (S73).

In Pattern 2 of Operation Example 2, even in a situation in which the wearable camera 10 is not placed on the charging stand 300 while the police officer is out, the device management server 55 can manage the position of the wearable camera 10 based on the GPS position information transmitted from the wearable camera 10.

As described above, in Operation Example 2, regardless of whether the wearable camera 10 is inside or outside the police department, the device management server 55 can manage the position of the wearable camera 10. Thus, it is possible to avoid the loss of the wearable camera as much as possible. In addition, it is possible to save the trouble of a police officer looking for the wearable camera in an emergency, and it is possible to quickly respond. Also, when the wearable camera 10 is lost, the device management server 55 can track the position of the wearable camera. Accordingly, the system administrator can find the wearable camera quickly.

As described above, in the asset management system 5 according to Embodiment 1, the device management server 55 registers the position information of the charging stand 300 capable of charging each of the plurality of wearable cameras 10, in the asset management database 57 in advance. The device management server 55 updates the position information of the corresponding wearable camera 10 and registers the updated position information in the asset management database 57, in response to receiving of the first state change signal transmitted from the charging stand 300 in response to placement of the wearable camera 10 on the charging stand 300.

Thus, the charging stand 300 is installed in a state of being fixed at a predetermined location of the police department, and thus, in a case where the wearable camera 10 is placed on the charging stand 300, the device management server 55 can accurately recognize the position of the wearable camera 10 based on the position information of the charging stand 300 transmitted from the charging stand 300.

The device management server 55 updates the position information of the corresponding wearable camera 10 and registers the updated position information in the asset management database 57, in response to receiving of the second state change signal transmitted from the charging stand 300 in response to removal of the wearable camera 10 from the charging stand 300. Thus, the device management server 55 can check that the wearable camera 10 has been removed from the charging stand 300. In addition, the device management server 55 can check the position of the wearable camera 10 at a time point at which the wearable camera 10 has been removed from the charging stand 300.

The device management server 55 registers, in advance, the position information of the charging stand 300 capable of charging each of the plurality of wearable cameras 10, in the asset management database 57. The device management server 55 updates the position information of the corresponding wearable camera 10 and registers the updated position information in the asset management database 57, in response to receiving of the first state change signal transmitted from the wearable camera 10 in response to placement of the wearable camera 10 on the charging stand 300. Thus, in a case where the wearable camera 10 is placed on the charging stand 300, the device management server 55 can accurately recognize the position information of the wearable camera 10 based on the position of the charging stand transmitted from the wearable camera 10.

The device management server 55 updates the position information of the corresponding wearable camera 10 and registers the updated position information in the asset management database 57, in response to receiving of the second state change signal transmitted from the wearable camera 10 in response to removal of the wearable camera 10 from the charging stand 300. Thus, the device management server 55 can check that the wearable camera 10 has been removed from the charging stand 300. In addition, the device management server 55 can check the position of the wearable camera 10 at a time point at which the wearable camera 10 has been removed from the charging stand 300.

In addition, the wearable camera 10 can specify the position information of the wearable camera based on the GPS data obtained by the GPS receiving unit 18. If the wearable camera 10 detects a connection to another network NW2 different from the network NW1 in the police department, the wearable camera 10 transmits the position information of the wearable camera 10 to the device management server 55 via the other network NW2. Thus, the wearable camera 10 can quickly transmit the position information of the wearable camera through the other network NW2 even though the network NW1 in the police department has a delay in communication due to traffic or the like.

The device management server 55 displays position information of the wearable camera 10 registered in the asset management database 57 on the back end client 70a in response to the access from the back end client 70a. Thus, the system administrator hm who operates the back end client 70a can visually check the latest position information of the wearable camera 10.

Hitherto, various embodiments have been described with reference to the drawings, but and the present disclosure is not limited to such examples. It is clear that those skilled in the art can conceive various changes, modifications, substitutions, additions, deletions, and equivalents within the scope of the claims, and it is understood that they belong to the technical scope of the present disclosure. Further, the components in the above-described various embodiments may be randomly combined without departing from the spirit of the invention.

The present disclosure is useful as an asset management system and an asset management method for properly managing a wearable camera by regularly determining whether or not the wearable camera used in the daily work of a police or investigative agency has failure and suppressing deterioration of business efficiency of police officers or investigators.

The present application is based upon Japanese Patent Application (Patent Application No. 2019-122355 filed on Jun. 28, 2019), the content of which is incorporated herein by reference.

What is claimed is:

1. An asset management system comprising:
   plurality of cameras, each of the plurality of cameras is mountable by a police officer or a vehicle; and
   a server that is configured to manage information regarding the plurality of cameras, and is communicably connected to the plurality of cameras, wherein:
   each of the plurality of cameras repeatedly diagnoses whether or not the camera has a failure at a predetermined timing and sends, to the server, a diagnosis result,
   the server is connected to a database, accumulates diagnosis results of the plurality of cameras in the database, and concurrently displays the diagnosis results of the plurality of cameras on an external terminal, and
   each of the displayed diagnosis results includes identification information, camera type information, update time information, and status information of a corresponding camera of the plurality of cameras.

2. The asset management system according to claim 1, wherein:
   the server displays the diagnosis results of the plurality of cameras the external terminal in response to an access from the external terminal.

3. The asset management system according to claim 2, wherein:
   the status information indicates whether or not a battery built in the corresponding camera or an external recording medium inserted into the corresponding camera has the failure, and the update time information indicates an update time point of the diagnosis result of the corresponding camera.

4. The asset management system according to claim 3, wherein:
   in response to a user selecting, on the external terminal, a display region indicating abnormality in the battery or the external recording medium, the server displays details of the abnormality in the battery or the external recording medium.

5. The asset management system according to claim 1, wherein:
the server displays a detection notification of abnormal data on the external terminal in a case where the server determines that a diagnosis result of the diagnosis results of the plurality of cameras includes the abnormal data.

6. The asset management system according to claim 1, wherein:
the server registers, in the database, position information of a charging stand configured to charge each of the plurality of cameras,
the charging stand sends a first state change signal to the server in response to placement of each of the plurality of cameras on the charging stand, and
in response to the first state change signal being received by the server, the server updates position information of a corresponding camera triggering the first state change signal and registers the updated position information in the database.

7. The asset management system according to claim 6, wherein:
the charge stand sends a second state change signal to the server in response to removal of each of the plurality of cameras from the charging stand, and
in response to the second state change signal being received by the server, the server updates the position information of a corresponding camera triggering the second state change signal and registers the updated position information of the corresponding camera triggering the second state change signal in the database.

8. The asset management system according to claim 6, wherein the server displays the position information of the corresponding camera on the external terminal in response to an access from the external terminal.

9. The asset management system according to claim 1, wherein:
the server registers, in the database, position information of a charging stand configured to charge each of the plurality of cameras,
each of the plurality of cameras sends a first state change signal to the server in response to being placed on the charging stand, and
in response to the first state change signal being received by the server, the server updates position information of a corresponding camera triggering the first state change signal and registers the updated position information in the database.

10. The asset management system according to claim 9, wherein:
each of the plurality of cameras sends a second state change signal to the server in response to being removed from the charging stand, and
in response to the second state change signal being received by the server, the server updates the position information of a corresponding camera triggering the second state change signal and registers the updated position information of the corresponding camera triggering the second state change signal in the database.

11. The asset management system according to claim 1, wherein:
in response to detection of a connection of a camera of the plurality of cameras to another network different from a network in a police department, the wearable camera is configured to specify position information of the camera, and sends, to the server via the another network, the position information of the camera.

12. The asset management system according to claim 1, wherein:
the identification information indicates an identifier of the corresponding camera,
the update time information indicates a diagnosis result update time of the corresponding camera, and
the status information indicates a status of a component of the corresponding camera.

13. The asset management system according to claim 12, wherein:
the status information indicates statuses of a battery and a memory of the corresponding camera.

14. The asset management system according to claim 12, wherein:
the server displays component information on the external terminal, in response to a user selecting the status on the external terminal.

15. An asset management method performed by an asset management system including a plurality of cameras and a server, each of the plurality of cameras is mountable by a police officer or a vehicle, the server is configured to manage information regarding the plurality of cameras and is communicably connected to the plurality of cameras and a database, the asset management method comprising:
repeatedly diagnosing, by each of the plurality of cameras, whether or not the camera has a failure at a predetermined timing and sending, to the server, a diagnosis result;
accumulating, by the server, diagnosis results of the plurality of cameras in the database; and
concurrently displaying, by the server, the diagnosis results of the plurality of cameras on an external terminal, wherein:
each of the displayed diagnosis results includes identification information, camera type information, update time information, and status information of a corresponding camera of the plurality of cameras.

16. An asset management system comprising:
a wearable camera that is mountable by a police officer; and
a server that is configured to manage information regarding the wearable camera and is communicably connected to the wearable camera, wherein:
the wearable camera repeatedly diagnoses whether or not the wearable camera has a failure at a predetermined timing and sends, to the server, a diagnosis result,
the server is connected to a database, accumulates the diagnosis result in the database in response to the diagnosis result of the wearable camera being received by the server, and displays the diagnosis result of the wearable camera on an external terminal,
the server registers, in the database, position information of a charging stand configured to charge each of a plurality of wearable cameras,
the charging stand sends a first state change signal to the server in response to placement of each of the plurality of wearable cameras on the charging stand, and
in response the first state change signal being received by the server, the server updates position information of a corresponding wearable camera triggering the first state change signal and registers the updated position information in the database.

17. The asset management system according to claim 16, wherein:

the charging stand sends a second state change signal to the server in response to removal of each of the plurality of wearable cameras from the charging stand, and in response to the second state change signal being received by the server, the server updates the position information of a corresponding wearable camera triggering the second state change signal, and registers the updated position information of the corresponding wearable camera triggering the second state change signal in the database.

18. An asset management system comprising:

a wearable camera that is mountable by a police officer; and a server that is configured to manage information regarding the wearable camera and is communicably connected to the wearable camera, wherein:

the wearable camera repeatedly diagnoses whether or not the wearable camera has a failure at a predetermined timing and sends, to the server, a diagnosis result, the server is connected to a database, accumulates the diagnosis result in the database in response to the diagnosis result of the wearable camera being received by the server, and displays the diagnosis result of the wearable camera on an external terminal, the server registers, in the database, position information of a charging stand configured to charge each of a plurality of wearable cameras, each of the plurality of wearable cameras sends a first state change signal to the server in response to being placed on the charging stand, and in response to the first state change signal being received by the server, the server updates position information of a corresponding wearable camera triggering the first state change signal and registers the updated position information in the database.

19. The asset management system according to claim 18, wherein:

each of the plurality of wearable cameras sends a second state change signal to the server in response to being removed from the charging stand, and in response to the second state change signal being received by the server, the server updates the position information of a corresponding wearable camera triggering the second state change signal and registers the updated position information of the corresponding wearable camera triggering the second state change signal in the database.

* * * * *